United States Patent
Kaufman et al.

(10) Patent No.: US 12,412,342 B2
(45) Date of Patent: Sep. 9, 2025

(54) MODELING INTERFACES WITH PROGRESSIVE CLOTH SIMULATION

(71) Applicant: Adobe Inc., San Jose, CA (US)

(72) Inventors: Daniel Kaufman, Seattle, WA (US); Yun Fei, Alameda, CA (US); Jeremie Dumas, Seattle, WA (US); Alec Jacobson, Toronto (CA); Jiayi Zhang, Stanford, CA (US)

(73) Assignee: Adobe Inc., San Jose, CA (US)

( * ) Notice: Subject to any disclaimer, the term of this patent is extended or adjusted under 35 U.S.C. 154(b) by 241 days.

(21) Appl. No.: 17/989,239

(22) Filed: Nov. 17, 2022

(65) Prior Publication Data
US 2024/0169672 A1   May 23, 2024

(51) Int. Cl.
*G06T 17/20* (2006.01)

(52) U.S. Cl.
CPC ........ *G06T 17/205* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 11,869,163 B1* | 1/2024 | Liang | G06V 10/774 |
| 2005/0163360 A1* | 7/2005 | Snoeren | G06T 7/35 |
| | | | 382/294 |
| 2019/0043269 A1* | 2/2019 | Lin | G06T 7/62 |
| 2019/0130649 A1* | 5/2019 | O'Brien | G06T 15/005 |

OTHER PUBLICATIONS

Marvelous Designer, Available online at: https://www.marvelousdesigner.com, 2022, 5 pages.
Bai et al., Artist-Directed Dynamics for 2d Animation, ACM Transactions on Graphics (TOG), vol. 35, No. 4 Available online at: https://doi.org/10.1145/2897824.2925884, Jul. 24-28, 2016, pp. 1-10.

(Continued)

*Primary Examiner* — Yi Wang
(74) *Attorney, Agent, or Firm* — Kilpatrick Townsend & Stockton LLP

(57) ABSTRACT

A system accesses a virtual scene including a three-dimensional (3D) object and a mesh object that models a cloth object. The system performs a refinement simulation to model a drape of the cloth object over the 3D object. Performing the refinement simulation includes, for each of a sequence of mesh resolutions: determining a configuration of the mesh model that minimizes a proxy energy function of a finest mesh resolution of the sequence of mesh resolutions. The system generates, for display via a user interface during the refinement simulation, an editable preview object comprising the mesh object at a coarsest level mesh resolution. The system receives a modification to the editable preview object and displays the modified editable preview object. A configuration of a finest level mesh resolution of the mesh object in the refinement simulation is geometrically consistent with a configuration of the modified editable preview object.

19 Claims, 9 Drawing Sheets

(56) References Cited

OTHER PUBLICATIONS

Baraff et al., Large Steps in Cloth Simulation, In Proceedings of the 25th annual conference on Computer graphics and interactive techniques, Available online at: https://doi.org/10.1145/280814.280821, Jul. 19-24, 1998, pp. 43-54.
Bender et al., Fast and Stable Cloth Simulation Based on Multi-Resolution Shape Matching, Computers & Graphics, vol. 37, No. 8, Dec. 1, 2013, pp. 1-7.
Bergou et al., Tracks: Toward Directable Thin Shells, ACM Transactions on Graphics, vol. 26, No. 3 Available online at: https://doi.org/10.1145/1276377.1276439, Jul. 29, 2007, 10 pages.
Bollhofer et al., State-of-the-Art Sparse Direct Solvers, Parallel Algorithms in Computational Science and Engineering, Available online at: https://doi.org/10.1007/978-3-030-43736-7_1, Jul. 7, 2020, 31 pages.
Bornemann et al., The Cascadic Multigrid Method for Elliptic Problems, Numerische Mathematik, vol. 75, No. 2, Dec. 1996, pp. 135-152.
Bouaziz et al., Projective Dynamics: Fusing Constraint Projections for Fast Simulation, ACM Transaction on Graphics, vol. 33, No. 4, Article 154, Available online at: https://doi.org/10.1145/2601097.2601116, Jul. 2014, 11 pages.
Bridson et al., Robust Treatment of Collisions, Contact and Friction for Cloth Animation, ACM Transactions on Graphics, vol. 21, No. 3, Available online at: https://doi.org/10.1145/566654.566623, Jul. 1, 2002, 10 pages.
Briggs et al., A Multigrid Tutorial, 2nd Edition, SIAM, Available online at: https://www.math.hkust.edu.hk/~mamu/courses/531/tutorial_with_corrections.pdf, Jan. 2000, 193 pages.
Chen et al., Fine Wrinkling on Coarsely Meshed Thin Shells, ACM Transactions on Graphics (TOG), vol. 40, No. 5, Article 190, Available online at: https://doi.org/10.1145/3462758, Jul. 2021, pp. 1-32.
Chen et al., Physical Simulation of Environmentally Induced Thin Shell Deformation, ACM Transactions on Graphics, vol. 37, No. 4, Article 146, Available online at: https://doi.org/10.1145/3197517.3201395, Aug. 2018, pp. 1-13.
Clyde et al., Modeling and Data-driven Parameter Estimation for Woven Fabrics, In Proceedings of the ACM SIG-GRAPH/Eurographics Symposium on Computer Animation, Available online at: https://doi.org/10.1145/3099564.3099577, Jul. 28-30, 2017, 11 pages.
Daviet, Simple and Scalable Frictional Contacts for Thin Nodal Objects, ACM Transactions on Graphics, vol. 39, No. 4, Available online at: https://doi.org/10.1145/3386569.3392439, Aug. 12, 2020, pp. 61:1-61:16.
Gillette et al., Real-Time Dynamic Wrinkling of Coarse Animated Cloth, In Proceedings of the 14th ACM SIGGRAPH/eurographics symposium on computer animation, Available online at: https://doi.org/10.1145/2786784.2786789, Aug. 7, 2015, 10 pages.
Goldenthal et al., Efficient Simulation of Inextensible Cloth, ACM Transactions on Graphics, vol. 26, No. 3, Available online at: https://doi.org/10.1145/1276377.1276438, Jul. 29, 2007, 7 pages.
Gratton et al., Recursive Trust-Region Methods for Multiscale Nonlinear Optimization, SIAM Journal on Optimization, vol. 19, No. 1, Available online at: https://doi.org/10.1137/050623012, 2008, pp. 414-444.
Grinspun et al., Discrete Shells, In Proceedings of the 2003 ACM SIGGRAPH/Eurographics symposium on Computer animation, Jul. 26, 2003, 7 pages.
Guo et al., A Material Point Method for Thin Shells with Frictional Contact, ACM Transactions on Graphics, vol. 37, No. 4, Available online at: https://doi.org/10.1145/3197517.3201346, Jul. 30, 2018, pp. 1-15.
Hahn et al., Subspace Clothing Simulation Using Adaptive Bases, ACM Transactions on Graphics, vol. 33, No. 4, Available online at: https://doi.org/10.1145/2601097.2601160, Jul. 27, 2014, 8 pages.
Harmon et al., Asynchronous Contact Mechanics, ACM Transactions on Graphics, vol. 28, No. 4, Jul. 27, 2009, 13 pages.
Harmon et al., Robust Treatment of Simultaneous Collisions, ACM Transactions on Graphics, vol. 27, No. 3, Available online at: https://doi.org/10.1145/1360612.1360622, Aug. 1, 2008, 4 pages.
Henson, Multigrid Methods Nonlinear Problems: An Overview, In Proceedings of SPIE—The International Society for Optical Engineering, vol. 5016, 2003, 15 pages.
Ho et al., Newton-Type Multilevel Optimization Method, Optimization Methods and Software, Nov. 26, 2019, pp. 1-34.
Hoppe, Progressive Meshes, In Proceedings of the 23rd Annual Conference on Computer Graphics and Interactive Techniques (SIGGRAPH '96). Association for Computing Machinery, Available online at: https://doi.org/10.1145/237170.237216, Aug. 1, 1996, 10 pages.
Jiang et al., Anisotropic Elastoplasticity for Cloth, Knit and Hair Frictional Contact, ACM Transactions on Graphics, vol. 36, No. 4, Jul. 2017, 14 pages.
Jin et al., A Pixel-Based Framework for Data-Driven Clothing, Computer Graphics Forum, vol. 39, No. 8, Dec. 2020, pp. 135-144.
Kavan et al., Physics-Inspired Upsampling for Cloth Simulation in Games, ACM Transactions on Graphics, vol. 30, No. 4, Jul. 25, 2011, 9 pages.
Kim, A Finite Element Formulation of Baraff-Witkin Cloth, SCA '20: Proceedings of the ACM SIGGRAPH/Eurographics Symposium on Computer Animation, vol. 39, No. 8, Nov. 24, 2020, 9 pages.
Kopanicakova et al., Subdivision-Based Nonlinear Multiscale Cloth Simulation, SIAM Journal on Scientific Computing, vol. 41, No. 5, Oct. 2019, pp. S433-S461.
Lahner et al., DeepWrinkles: Accurate and Realistic Clothing Modeling, In Proceedings of the European Conference on Computer Vision (ECCV), Aug. 10, 2018, 18 pages.
Li et al., An Implicit Frictional Contact Solver for Adaptive Cloth Simulation, ACM Transactions on Graphics (TOG) vol. 37, No. 4, Article 52. Also available at: https://doi.org/10.1145/3197517.3201308, submitted Jul. 10, 2018, published Aug. 2018, 15 pages.
Li et al., Codimensional Incremental Potential Contact, ACM Transactions on Graphics vol. 40, No. 4. Also available at: //doi.org/10.1145/3450626.3459767, Jul. 19, 2021, 24 pages.
Li et al., P-Cloth: Interactive Complex Cloth Simulation on Multi-GPU Systems Using Dynamic Matrix Assembly and Pipelined Implicit Integrators, ACM Transactions on Graphics, vol. 39, No. 6, Dec. 2020, pp. 180:1-180:15.
Ly et al., Projective Dynamics with Dry Frictional Contact, CM Transactions on Graphics (TOG), Association for Computing Machinery, vol. 39, No. 4, 2020, pp. 57:1-57:8.
Macklin et al., XPBD: Position-Based Simulation of Compliant Constrained Dynamics, In Proceedings of the 9th International Conference on Motion in Games, Oct. 10, 2016, pp. 49-54.
Miguel et al., Data-Driven Estimation of Cloth Simulation Models, In Computer Graphics Forum, vol. 31, No. 2, May 1, 2012, 10 pages.
Muller et al., Position Based Dynamics, Journal of Visual Communication and Image Representation, vol. 18, No. 2, Apr. 2007, 10 pages.
Muller et al., Wrinkle Meshes, In Symposium on Computer Animation, 2010, 8 pages.
Narain et al., Adaptive Anisotropic Remeshing for Cloth Simulation, ACM Transactions on Graphics, vol. 31, No. 6. Also available at: https://doi.org/10.1145/2366145.2366171, Nov. 2012, 10 pages.
Narain et al., Folding and Crumpling Adaptive Sheets, ACM Transactions on Graphics (TOG), vol. 32, No. 4. Available at: https://doi.org/10.1145/2461912.2462010, Jul. 21, 2013, 8 pages.
Otaduy et al., Implicit Contact Handling for Deformable Objects, Computer Graphics Forum, vol. 28, No. 2, Apr. 1, 2009, 10 pages.
Penava et al., Determination of the Elastic Constants of Plain Woven Fabrics by a Tensile Test in Various Directions, Fibres & Textiles in Eastern Europe vol. 104. No. 2, Mar. 2014, pp. 57-63.
Romero et al., Physical Validation of Simulators in Computer Graphics: A New Framework Dedicated to Slender Elastic Structures and Frictional Contact, ACM Transactions on Graphics vol. 40, No. 4, 2021, 19 pages.

(56) References Cited

OTHER PUBLICATIONS

Sacht et al., Nested Cages, ACM Transactions on Graphics (TOG) vol. 34, No. 6, Nov. 2, 2015, pp. 1-14.
Santesteban et al., Learning-Based Animation of Clothing for Virtual Try-On, In Computer Graphics Forum, vol. 38, No. 2, May 2019, pp. 355-366.
Schmitt et al., Multilevel Cloth Simulation Using GPU Surface Sampling, Virtual Reality Interactions and Physical Simulations (VRIPHYS), Nov. 2013, pp. 1-10.
Sellan et al., Breaking Good: Fracture Modes for Realtime Destruction, ACM Transactions on Graphics, arXiv preprint arXiv:2111.05249, Jul. 2022, 12 pages.
Tamstorf et al., Discrete Bending Forces and Their Jacobians, Graphical Models vol. 75, No. 6, Nov. 1, 2013, pp. 362-370.
Tamstorf et al., Smoothed Aggregation Multigrid for Cloth Simulation, ACM Transactions on Graphics (TOG) vol. 34, No. 6, Nov. 2, 2015, pp. 1-13.
Tang et al., A GPU-Based Streaming Algorithm for High-Resolution Cloth Simulation, In Computer Graphics Forum, vol. 32 No. 7, Oct. 1, 2013, pp. 21-30.
Tang et al., CAMA: Contact-Aware Matrix Assembly with Unified Collision Handling for GPU-Based Cloth Simulation, In Computer Graphics Forum vol. 35, No. 2, May 2016, pp. 511-521.
Tang et al., I-Cloth: Incremental Collision Handling for GPU-based Interactive Cloth Simulation, ACM Transaction on Graphics (Proceedings of SIGGRAPH Asia), vol. 37, No. 6, Nov. 2018, 204:1-10.
Tang et al., I-Cloth: Incremental Collision Handling for GPU-Based Interactive Cloth Simulation, ACM Transactions on Graphics (TOG), vol. 37, No. 6, Dec. 4, 2018, pp. 1-10.
Terzopoulos et al., Elastically Deformable Models, In Proceedings of the 14th annual conference on Computer graphics and interactive techniques., Jul. 1987, pp. 205-214.
Umetani et al., Sensitive Couture for Interactive Garment Modeling and Editing, ACM Transactions on Graphics vol. 30, No. 4. Also available at: https://doi.org/10.1145/1964921.1964985, Jul. 25, 2011, 12 pages.
Volino et al., Implementing Fast Cloth Simulation with Collision Response, In Proceedings Computer Graphics International 2000, Jun. 19, 2000, 10 pages.
Vouga, Asynchronous Variational Contact Mechanics, Computer Methods in Applied Mechanics and Engineering vol. 200, No. 25-28, Jun. 15, 2011, pp. 1-8.
Wang et al., GPU-Based Simulation of Cloth Wrinkles at Submillimeter Levels, ACM Transactions on Graphics, vol. 40, No. 4. Also available at: https://doi.org/10.1145/3450626.3459787, Jul. 19, 2021, 14 pages.
Wang et al., Parallel Multigrid for Nonlinear Cloth Simulation, Computer Graphics Forum vol. 37, No. 7, Oct. 24, 2018, pp. 131-141.
Weischedel et al., A Discrete Geometric View on Shear-Deformable Shell Models, Aug. 15, 2012, 105 pages.
Wu et al., A Safe and Fast Repulsion Method for GPU-Based Cloth Self Collisions, ACM Transactions on Graphics vol. 40, No. 1. Also available at: https://doi.org/10.1145/3430025, Dec. 25, 2020, 18 pages.
Xian et al., A Scalable Galerkin Multigrid Method for Real-Time Simulation of Deformable Objects, ACM Transactions on Graphics (TOG) vol. 38, No. 6. Also available at: https://doi.org/10.1145/3355089.3356486, Nov. 8, 2019, pp. 1-13.
Zhang et al., Accelerating ADMM for Efficient Simulation and Optimization, ACM Transactions on Graphics vol. 38 No. 6. Also available at: https://doi.org/10.1145/3355089.3356491, Nov. 8, 2019, 21 pages.
Zurdo et al., Animating Wrinkles by Example on Non-Skinned Cloth, IEEE Transactions on Visualization and Computer Graphics vol. 19, No. 1, Mar. 19, 2012, pp. 1-3.

* cited by examiner

200

210

ACCESSING A VIRTUAL SCENE INCLUDING A THREE-DIMENSIONAL (3D) OBJECT AND A VIRTUAL CLOTH OBJECT

220

PERFORMING A REFINEMENT SIMULATION TO MODEL A DRAPE OF THE VIRTUAL CLOTH OBJECT OVER THE 3D OBJECT, WHEREIN THE REFINEMENT SIMULATION INCLUDES DETERMINING AT EACH OF A SEQUENCE OF INCREASING MESH RESOLUTIONS OF A MESH OBJECT REPRESENTING THE CLOTH OBJECT, A CONFIGURATION OF THE MESH OBJECT, WHEREIN THE CONFIGURATION OF THE MESH OBJECT AT EACH OF THE SEQUENCE OF MESH RESOLUTIONS MINIMIZES A PREDETERMINED PROXY ENERGY FUNCTION OF A FINEST LEVEL MESH RESOLUTION

230

CONSTRUCTING, FOR DISPLAY VIA A USER INTERFACE, AN EDITABLE PREVIEW OBJECT COMPRISING THE MESH OBJECT AT A COARSEST MESH RESOLUTION, THE EDITABLE PREVIEW OBJECT GENERATED SUCH THAT A CONFIGURATION OF A FINEST LEVEL MESH RESOLUTION OF THE MESH OBJECT GENERATED VIA THE SIMULATION IS CONSISTENT WITH A CONFIGURATION OF THE EDITABLE PREVIEW OBJECT AND WITH ANY MODIFICATIONS TO THE CONFIGURATION OF THE EDITABLE PREVIEW OBJECT

240

DISPLAYING, VIA A USER INTERFACE, THE VIRTUAL CLOTH OBJECT OVERLAID OVER THE 3D OBJECT USING THE CONFIGURATION OF THE MESH OBJECT DETERMINED IN THE REFINEMENT SIMULATION AT THE FINEST MESH RESOLUTION, BASED ON THE EDIT TO THE EDITABLE PREVIEW OBJECT

410
DURING A REFINEMENT SIMULATION, DISPLAYING, VIA A USER INTERFACE, AN EDITABLE PREVIEW OBJECT

420 USER UPDATES PARAMETERS? — YES / NO

425 CONTINUING A CURRENT REFINEMENT SIMULATION

430 PAUSING A CURRENT REFINEMENT SIMULATION AND PERFORMING A PREVIEW SIMULATION BASED ON THE UPDATED PARAMETERS TO GENERATE A MODIFIED COARSEST LEVEL PREVIEW OBJECT, WHEREIN A CONFIGURATION OF THE MODIFIED COARSE LEVEL PREVIEW OBJECT MINIMIZES THE PROXY ENERGY FUNCTION FOR THE FINEST LEVEL MESH RESOLUTION OF THE MESH OBJECT

310, FIG. 3

(USING MODIFIED COARSEST LEVEL PREVIEW OBJECT GENERATED IN 440)

*FIG. 4*

MODELING INTERFACES WITH PROGRESSIVE CLOTH SIMULATION

TECHNICAL FIELD

This disclosure generally relates to techniques for physics-based modeling of drapes of cloth. More specifically, but not by way of limitation, this disclosure relates to improvements to modeling interfaces for simulating drapes of cloth.

BACKGROUND

Conventional modeling systems can model a drape of cloth (e.g. including wrinkles and folds) over an object based on the known physical properties and interactions of the cloth material and the object.

SUMMARY

The present disclosure describes techniques for generating an editable preview object for use in a progressive cloth simulation for generating an overlaid virtual cloth object. A scene modeling system accesses a virtual scene including a three-dimensional (3D) virtual object and a mesh object that models a virtual cloth object. The scene modeling system performs a refinement simulation on the mesh object to model a drape of the virtual cloth object over the 3D virtual object. Performing the refinement simulation includes, for each of a sequence of mesh resolutions of the mesh object: determining a proxy energy function of a finest mesh resolution of the sequence of mesh resolutions, determining a configuration of the mesh model that minimizes the proxy energy function. The scene modeling system generates, for display via a user interface, an editable preview object comprising the mesh object at a coarsest level mesh resolution of the sequence of mesh resolutions and displays via the user interface, the editable preview object during performance of the refinement simulation. The scene modeling system receives, via the user interface, a modification to the editable preview object. The scene modeling system displays, via the user interface, the modified editable preview object. A configuration of a finest level mesh generated by the finest-level simulation of the mesh object in the refinement simulation is geometrically consistent with a configuration of the modified editable preview object.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts a method for generating an editable preview object for use in a progressive cloth simulation for generating an overlaid virtual cloth object, according to certain embodiments disclosed herein.

FIG. 4 depicts a method for providing user control over a progressive cloth simulation using a preview simulation and an editable preview object, according to certain embodiments disclosed herein, according to certain embodiments disclosed herein.

DETAILED DESCRIPTION

Figure 1:
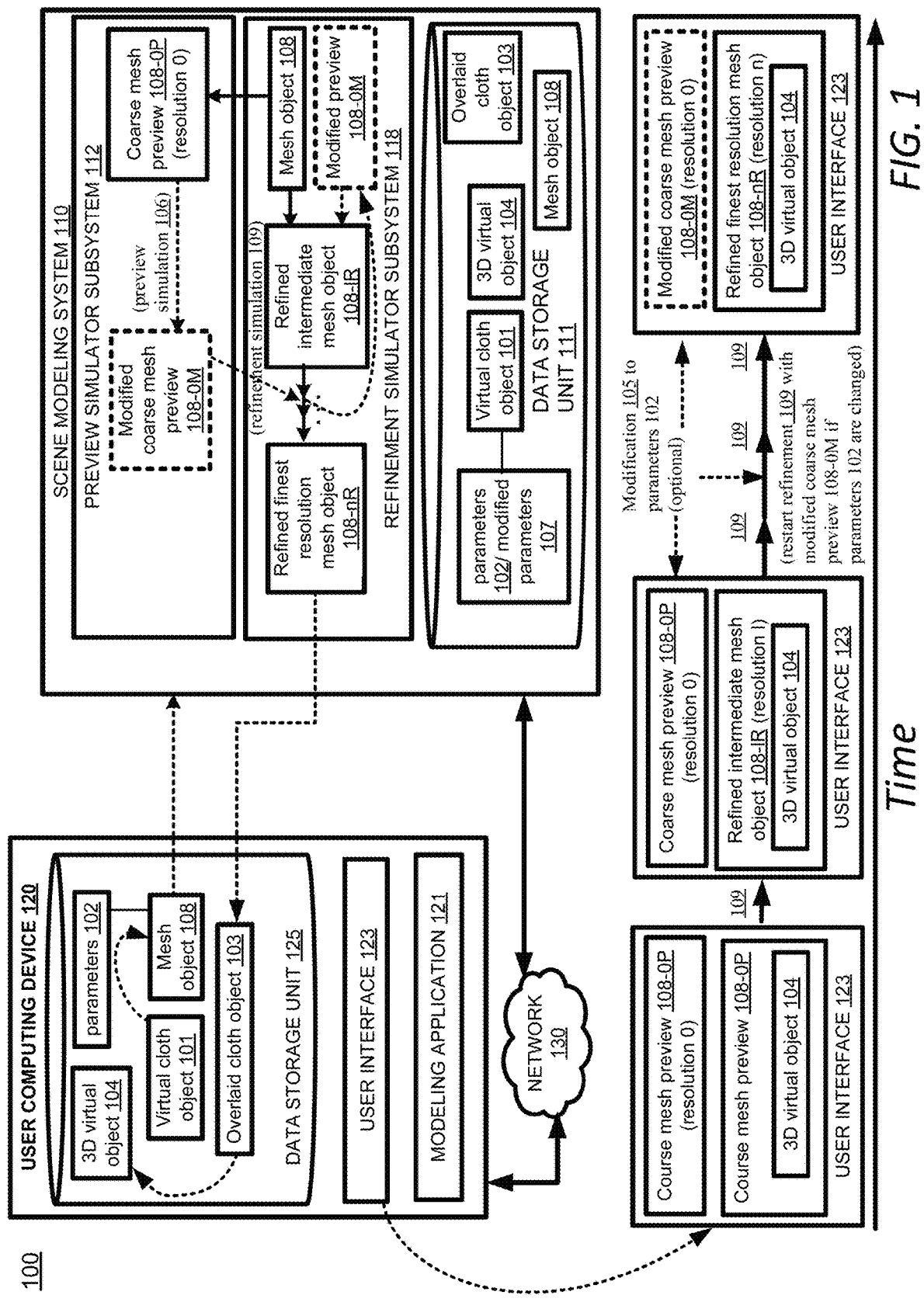
FIG. 1 depicts an example of a computing environment for generating an editable preview object for use in a progressive cloth simulation for generating an overlaid virtual cloth object, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

In conventional cloth modeling systems, which model a drape of cloth based on known physical properties and interactions (e.g. thin shell mechanics) of the cloth draped over an object, a tradeoff exists between achieving physically realistic cloth simulations (fidelity) and computationally-efficient simulations (speed). High speed approaches can be preferred when simulating extreme-scale cloth meshes including millions of vertices time stepped in a short time period (e.g. less than a second). However, the speeds reached by conventional high speed approaches require simplifying and limiting assumptions in the model to ensure computation stays within a predefined limit/budget. Introducing these assumptions significantly reduces the fidelity and expressive range of the material properties, geometries, and contact behaviors of the cloth material that is modeled using the high speed approach, resulting in unacceptable modeling errors in the form of intersections, irregular non-physical geometries, uncontrollable instabilities, and the inability to accurately represent common materials (e.g. cotton twill). Conventional high fidelity approaches, such as the Codimensional Incremental Potential Contact (C-IPC) cloth model, do not make these simplifying and limiting assumptions and therefore can simulate a drape of cloth that is more physically realistic than the drapes output by the high speed methods and can also simulate more types of materials than high speed approaches. However, these conventional high fidelity methods require more time to generate a result and require more usage of computational resources to generate an output compared to conventional high speed approaches. Accordingly, neither the high fidelity nor the high speed conventional approaches provide results that are both physically realistic and within an acceptable computational cost.

Conventional modeling systems have attempted to bridge the gap between the loss of speed and computational resources in high fidelity approaches and the loss of a realism in high speed simulations. For example, some conventional modeling systems use a high speed approach as a previsualization (preview) to explore scene variations (e.g. geometry, materials, boundary conditions) and then use parameters determined from the high speed approach as input to a high fidelity approach. Conventional nonlinear multilevel (NML) optimization approaches (e.g. the sensitive couture (SC) method) hierarchically and successively attempts to improve a result mesh by starting with a coarse simulation and ending in a final, high-resolution result mesh. However, these conventional progressive cloth simulation approaches do not ensure consistency across increasing mesh resolutions. For example, arbitrary and equally correct "fold jumps" across resolutions and unacceptable artifacts (e.g. kinks) can be introduced and propagated forward to finer resolutions and to the final, high resolution result mesh. Accordingly, in these conventional NML approaches, the final, high fidelity, output may differ substantially from the coarse mesh that was modified by the user and will have artifacts, which decreases a usefulness of the user interface in these conventional NML approaches.

Certain embodiments described herein address the limitations of conventional cloth modeling systems by providing a preview simulator whose output is progressively improved, for any drape, in increasing resolutions, with consistent fold geometries across levels. The preview simulator provides efficient and accurate previewing of a drape of the simulated cloth in any configuration, using a coarse-resolution mesh, that is consistent with a corresponding final, converged fine-level configuration. The preview simulator described herein enables a progressive and consistent solution improvement of the solution, starting from a coarse-mesh preview and ending with a converged, and so accurate fine-mesh result. The improved progressive cloth simulation method described herein predicts, using the preview simulator for each resolution of the mesh, coarse-scale folds and wrinkles that will be generated by a corresponding converged high-resolution and high-fidelity simulation, enabling more predictable cloth drape modeling over conventional progressive cloth simulation approaches that do not provide for consistency across resolutions and that introduce fold jumps and other artifacts between resolutions. This improved progressive cloth simulation therefore also improves a modeling interface by generating output meshes that are substantially consistent with a user's view of changes made to the coarse mesh model.

Further, the improved progressive cloth simulation method described herein provides a preview simulator that can interrupt the progressive simulation at any mesh level resolution to enable a user to update parameters (e.g. changing a material of the virtual cloth, changing a spatial configuration of the virtual cloth by deforming the coarse resolution mesh or pulling directly on the virtual cloth object to arrange it in the scene), and then resuming a refinement of the coarse level mesh with the changed parameters applied. Enabling an interruption of the simulation at any resolution reduces a computational cost required to achieve a desired result compared to conventional systems, which only enable editing after a simulation is complete and increase the usage of computing resources when a user makes a series of edits to the mesh object.

The following non-limiting example is provided to introduce certain embodiments. In this example, a scene modeling system accesses a three-dimensional (3D) virtual space including a 3D virtual object as well as a virtual cloth object. The 3D virtual object may be of a table, a basket of fruit, or other object over which a cloth may be draped. The 3D virtual space may represent an environment such as a room or an outdoor space. For example, the scene modeling system accesses a 3D virtual space including a 3D fruit basket object displayed within the 3D virtual space. The 3D virtual object may include defined dimensions, contours, or other information which defines a volume occupied by the 3D virtual object within the 3D virtual space. The virtual cloth object represents a shell material that is thin in one dimension. The virtual cloth object can comprise a cloth or cloth-like material, a felt, a paper, a plastic or polymer sheet, or other shell material that is thin in one dimension. For example, the virtual cloth object could be a table cloth, a blanket, a shirt, a dish towel, or other cloth object. The virtual cloth object is associated with parameters. The parameters can define a material (e.g. cotton, wool, silk, acrylic, or other material) of the cloth, a geometry of the cloth (e.g. square, rectangle), a position of the cloth in the virtual space with respect to the 3D object, or other characteristic of the cloth. In some instances, the scene modeling system accesses the 3D virtual space including the 3D virtual object and the virtual cloth object responsive to receiving a user input. For example, a modeling application executing on a user computing device (e.g. a mobile device) of a user is associated with and communicates with the scene modeling system (e.g. via a network). In this example, the user accesses the modeling application, selects one or more objects on a user interface of the user computing device to request to access the 3D virtual object or generate a new 3D virtual object (e.g. a fruit basket) and a new cloth object (e.g. a decorative towel to drape over the fruit in the basket), the scene modeling system accesses the 3D virtual scene including the 3D object and the virtual cloth object responsive to receiving the user selection, and the scene modeling system provides the 3D virtual scene including the 3D virtual object and the virtual cloth object for display via the user interface of the user computing device. In some instances, the virtual cloth object is positioned above the 3D object. For example, a dish towel object is positioned above a fruit bowl object and the dish towel has no creases or folds.

The scene modeling system simulates a drape of the virtual cloth object over the 3D object. For example, the scene modeling system determines, for a dish towel that is above the fruit bowl object, a drape of the dish towel over the fruit bowl from its current position in the virtual space. Simulating the drape includes determining, based on the parameters of the cloth object and at each of a sequence of increasing mesh resolutions of a mesh object representing the virtual cloth object, the configuration of the mesh object. The sequence of increasing mesh resolutions can include a coarsest mesh resolution, one or more optional intermediate mesh resolutions, and a finest mesh resolution. The mesh object can include nodes which form a mesh of adjacent triangles. As the resolution of the mesh object increases, a number of triangles of the mesh object increases. For example the coarse resolution mesh includes a lesser number of triangles (a lesser resolution) than the final high-resolution result mesh. The configuration of the mesh object is the geometrical arrangement, within virtual space, of nodes of the mesh object, where the nodes form corners of the triangles of the mesh object. The scene modeling system can define a triangle mesh hierarchy that includes mapping functions (e.g. prolongation operators) which map from one mesh resolution level to a next (finer) mesh resolution level. In some instances, the triangle mesh hierarchy is a nested triangle mesh hierarchy. The scene modeling system can determine, during a refinement of the mesh object during the simulation of the drape and by a proxy energy function, the configuration of the mesh object at each mesh resolution level so that the determined configuration minimizes a proxy energy function defining a proxy energy for a finest level mesh resolution of the mesh object. The scene modeling system determines a proxy energy function for each resolution level and minimizes the proxy energy function at each level during the refinement of the mesh object. In some instances, the predetermined proxy energy function is based on a combination of known cloth object interactions including membrane interactions, bending interactions, contact barrier interactions, friction interactions, strain-limiting interactions, pulling and dragging of the virtual cloth object by users, user transforms of collision geometry, and other interactions of the cloth material as defined by the parameters of the virtual cloth object. For example, the interactions of a cotton material with itself and its environment are different from corresponding interactions of a wool material.

The scene modeling system can display, during the simulation of the drape, a preview object represented by a coarsest level resolution mesh of the virtual cloth object. At any point during the simulation of the drape of the virtual cloth object, which involves refinement of the mesh object at increasingly fine mesh resolutions, the user can modify the preview object and/or its environment. For example, the user can modify the preview object by deforming the preview object by moving one or more nodes of the mesh object, by changing a property associated with the virtual cloth object (e.g. changing a material from wool to cotton), changing a number of physical interactions of the virtual cloth object being modeled by the drape simulation, changing a position of the virtual cloth object, or other modification to the preview object. Modifying the environment of the preview object can include changing a position and orientation of geometries that are in contact with the preview object. The scene modeling system can receive an input with a request to apply the user changes to the preview object and then modify the preview object. The scene modeling system commences a drape simulation starting from the modified preview object, which is the mesh object at a coarsest level resolution. In some instances, the user may wait until after the simulation of the drape is completed before modifying the preview object. In some instances, the simulation of the drape can be safely interrupted with a new edit by the user at any point during the simulation. When no more changes to the preview object are received and the simulation of the drape of the most recently modified preview object is completed, the scene modeling system can display, based on the finest level resolution mesh object of the simulation, a virtual cloth object overlaid over the 3D object.

The scene modeling system displays, via a user interface, the virtual cloth object overlaid over the 3D object using the configuration of the mesh object determined at the finest mesh resolution. For example, the scene modeling system displays a dish towel object that is draped over a fruit bowl object, where the configuration and position of the dish towel object in virtual space corresponds to the configuration and position of the mesh object. For example, the scene modeling system displays a cloth object that has folds, creases, and other contours corresponding to the contours of the surface of the mesh object, based on the configuration of the mesh object at the finest mesh resolution. In some instances, a user can alternate between a view of the cloth object and the mesh object by selecting one or more objects of the user interface.

The embodiments described herein, specifically providing an interface to enable modifications to the preview object that will visually resemble a finest mesh resolution of the mesh object, significantly improves the functioning of modeling interfaces over conventional modeling interfaces. As previously discussed, in conventional modeling interfaces, a modified mesh model at a coarsest resolution level may not be consistent with the finest mesh resolution of the modified mesh model. The editable preview object of the embodiments described herein is superior to editable mesh models in the conventional systems because modifications made to its geometry by a user are consistent with a geometry of a finest-level mesh resolution of the mesh object, whereas, in conventional modeling interfaces, artifacts and other errors are propagated to finer resolutions and to the final, high resolution result mesh, resulting in a finest-level mesh resolution that may not resemble the initial edited mesh object and will often have significant visual artifacts. Because the final resolution of the mesh object is substantially consistent with modifications made to the preview object in the embodiments described herein, a number of inputs (e.g. subsequent editing operations performed on the mesh object) to the modeling interface to achieve a desired drape of the virtual cloth object can be reduced compared to conventional modeling interfaces, which may produce result meshes that are geometrically inconsistent (e.g. introduction of folds and other artifacts) with edits made by the user to the coarse level mesh and thus require further edits by the user to achieve a target drape.

Example Operating Environment for Providing a Progressive Cloth Simulation for Generating an Overlaid Virtual Cloth Object Referring now to the drawings, FIG. 1 depicts an example of a computing environment 100 generating an editable preview object for use in a progressive cloth simulation for generating an overlaid virtual cloth object 103. The computing environment 100 includes scene modeling system 110, which can include one or more processing devices that execute a preview simulator subsystem 112 and a refinement simulator subsystem 118. In certain embodiments, each of the preview simulator subsystem 112 and the refinement simulator subsystem 118 is a network server or other computing device connected to a network 130. The preview simulator subsystem 112 accesses or otherwise receives a 3D object 104 and a virtual cloth object 101. For example, the preview simulator subsystem 112 accesses the 3D object 104 and the virtual cloth object 101 from a data storage unit 111 of the scene modeling system 110 or otherwise accessible to the scene modeling system 110. In certain examples, the 3D object 104 and the virtual cloth object 101 is represented in a 3D virtual space with the virtual cloth object 101 positioned with respect to (e.g. positioned above) the 3D object 104. In certain examples, the 3D object 104 and/or the virtual cloth object 101 is generated by a user using the modeling application 121. The virtual cloth object 101 is associated with parameters 102. The parameters 102 can define a material (e.g. cotton, wool, silk, acrylic, or other material) of the cloth, a geometry of the cloth (e.g. square, rectangle), a position of the virtual cloth object 101 in the virtual space with respect to the 3D object 104, or other characteristic of the virtual cloth object 101. In some instances, the user can configure the parameters 102 via the user interface 123 of the user computing device 120. For example, the user can select one or more user interface 123 objects to select a material (e.g. cotton, wool, silk, acrylic, denim, etc.) and/or to change a geometry/position of the virtual cloth object 101 within the virtual space.

The scene modeling system 110 generates an overlaid virtual cloth object 103. The overlaid virtual cloth object 103 is draped over the 3D object 104. The scene modeling system 110 generates the overlaid virtual cloth object 103 using a mesh object 108. In some examples, the preview simulator subsystem 112 receives the 3D object 104 and the virtual cloth object 101 from the modeling application 121 via the network 130 along with a mesh object 108 representing the virtual cloth object 101. In some instances, the scene modeling system 110 generates the mesh object 108 for the 3D object 104. The mesh object 108 includes nodes (vertices) that are arranged in virtual space and that form corners of triangles that form the mesh object. In some instances, the mesh object that represents the virtual cloth object 101 is a mesh object 108 at a coarse mesh resolution (e.g. resolution 1 as depicted in FIG. 1). An example mesh resolution defines a predefined number of triangles for the mesh object 108 or defines a predefined number of nodes for the mesh object 108 which results in the predefined number of triangles.

Generating the overlaid virtual cloth object 103 includes performing a refinement simulation of a mesh object 108. Performing the refinement simulation includes determining, by the refinement simulator subsystem 118 based on the parameters 102 of the virtual cloth object 101 and at each of a sequence of increasing mesh resolutions (e.g. resolution 1, resolution 2, . . . resolution n as depicted in FIG. 1) of the mesh object 108 representing the virtual cloth object 101, the configuration of the mesh object 108. For example, the coarse mesh resolution (e.g. resolution 0) includes a predefined number of triangles (or nodes) for the mesh object. The configuration of the mesh object 108 at each of the sequence of mesh resolutions minimizes a predetermined proxy energy function of a finest level mesh resolution (e.g. resolution n). The refinement simulator subsystem 118 determines, at each mesh resolution level, a proxy energy function for a finest level mesh resolution (e.g. resolution n of the sequence of n mesh resolutions) of the mesh object 108 and then determines a configuration of the mesh object 108 at the next mesh level resolution that minimizes the proxy energy function. In this example, the determined configuration is the refined mesh object 108-1R at a next mesh resolution level (e.g. resolution level 1 or other value of 1 less than n). During the refinement simulation, the preview simulator subsystem 112 generates, in a preview simulation, a coarse mesh preview 108-0P. The coarse mesh preview 108-0P is displayed and can be modified via the user interface 123. The coarse mesh preview 108-0P can be modified to generate a modified coarse mesh preview 108-0M at any point during the refinement simulation. Modifying the coarse mesh preview 108-0P can include changing a configuration of the nodes/vertices in the coarse mesh preview 108-0P or changing the parameters 102 of the virtual cloth object 101 (e.g. changing the material being modeled from cloth to wool). In the example depicted in FIG. 1, the coarse mesh preview 108-0P is modified to generate the modified coarse mesh preview 108-0M after several mesh resolutions of the refinement simulation have already been conducted. As depicted in FIG. 1, upon generation of the modified coarse mesh preview 108-0M, the scene modeling system 110 restarts the refinement simulation using the modified mesh preview 108-0M as the starting mesh. In the example embodiments described herein, the configuration of the modified coarse mesh preview 108-0M generated by receiving a modification to the coarse mesh preview 108-0P is consistent with a configuration of the finest refined mesh object 108-nR generated via the refinement simulator subsystem 118. Further details about performing a refinement simulation and generating a coarse mesh preview object are described in FIG. 3. The scene modeling system 110 generates an overlaid cloth object 103 based on the refined finest resolution mesh object 108-nR. The scene modeling system 110 can display, via the user interface 123 of the user computing device 120, the overlaid cloth object 103 draping over the 3D object 104 in the virtual space, where the geometry of the overlaid cloth object 103 is determined based on the refined finest resolution mesh object 108-nR.

The scene modeling system 110 includes a data storage unit 111. An example data storage unit 111 is accessible to the scene modeling system 110 and stores data for the scene modeling system 110. In some instances, the data storage unit 111 stores a 3D virtual object 104, a virtual cloth object 101, parameters 102 associated with the virtual cloth object 101, a mesh object 108 generated based on the virtual cloth object 101, and an overlaid cloth object 103 generated by the scene modeling system 110.

An example user computing device 120 includes a modeling application 121, a user interface 123, and a data storage unit 125. In certain embodiments, the user computing device 120 is a smart phone device, a personal computer (PC), a tablet device, or other user computing device 120. In some embodiments, the user computing device 120 communicates with the scene modeling system 110 via the network 130.

The modeling application 121, in some embodiments, is associated with the scene modeling system 110 and the user downloads the modeling application 121 on the user computing device 120. For example, the user accesses an application store or a website of the scene modeling system 110 using the user computing device 120 and requests to download the modeling application 121 on the user computing device 120. The modeling application 121 operates on the user computing device 120 and enables a user of the user computing device 120 to retrieve a 3D object 104 and a virtual cloth object 101. The modeling application 121 enables the user to interact, via the user interface 123 with the scene modeling system 110. The modeling application 121 can communicate with the user interface 123 to receive one or more inputs from the user. The modeling application 121 can instruct the user interface 123 to display the 3D object 104, display the virtual cloth object 101, display the mesh object 108, display the coarse mesh preview 108-0P, and display refined mesh objects (e.g. 108-1R for one or more values of 1, 108-nR) at increasing mesh resolutions. In some embodiments, the modeling application 121 communicates with one or more of the preview simulator subsystem 112, the refinement simulator subsystem 118, or the data storage unit 111 of the scene modeling system 110.

In certain embodiments, the modeling application 121 includes the preview simulator subsystem 112 and the refinement simulator subsystem 118 and performs the operations described herein as being performed by the subsystems 112 and 118. For example, in certain embodiments, the modeling application 121 of the user computing device 120 can generate a mesh object 108 for the virtual cloth object 101, and generate based on the parameters 102 of the virtual cloth object 101 and at each of a sequence of increasing mesh resolutions (e.g. resolution 1 for one or more values of 1, and a finest resolution n) of the mesh object 108 representing the virtual cloth object 101, the configuration of the mesh object 108. The determined configuration at each mesh resolution 1 is represented in FIG. 1 by refined intermediate mesh object 108-1R. As shown by the arrows to the left of the refined intermediate mesh object 108-1R depicted in FIG. 1, the refinement simulation can be performed for multiple mesh resolutions. Although three arrows are depicted in FIG. 1, the refinement simulator subsystem 118 may refine the mesh into more or less mesh resolutions than the three resolutions depicted. For example, the refinement simulator subsystem 118 may perform one, two, five, ten, twenty, or other number of refinements of the mesh in the refinement simulation. Further, as shown in FIG. 1, the refinement simulation, after progressing through one or more mesh resolutions of the mesh object 108, may be interrupted by modification of the coarse mesh preview 108-0P and then recommence at the coarsest mesh resolution level using the modified coarse mesh preview 108-M. Although the refinement simulation is depicted in FIG. 1 as being interrupted once and restarting responsive to receiving a modification of the coarse mesh preview 108-0P, in some instances the refinement simulation can be interrupted multiple times and restart each of the multiple times, using a modified coarse mesh preview 108-0M that reflects a latest modification to the coarse mesh preview 108-0P.

The data storage unit 125 is accessible to the user computing device 120 and stores data for the user computing device 120. In some instances, the data storage unit 125 stores a 3D virtual object 104, a virtual cloth object 101, parameters 102 associated with the virtual cloth object 101, a mesh object 108 generated based on the virtual cloth object 101, and an overlaid cloth object 103 generated by the scene modeling system 110 (or generated by the application 121). In some instances, the data storage unit 125 is accessible to the scene modeling system 110 via the network 130. For example, the scene modeling system 110 can access data stored in the data storage unit 125 via the network 130.

The user interface 123 can include a touchscreen display interface, a display device (e.g. a monitor) with a separate input device (e.g. a mouse), or other user interface 123 which can receive one or more inputs from the user and display information or provide other output to the user. For example, the user interface 123 can display a 3D object 104 and a virtual cloth object 101 selected by the user as well as display a mesh object 108 associated with the virtual cloth object 101. In some instances, the user interface 123 displays the mesh object 108 overlaying the virtual cloth object 101. The user interface 123 receives one or more inputs from the user, in some instances, to define parameters 102 (or change the parameters 102 to modified parameters 107) for the virtual cloth object 101. In an example, the user, using one or more user interface 123 objects, defines parameters 102 such as the material of the virtual cloth object 101. For example, the user selects cotton as a parameter 102 from a choice among cotton, wool, and silk. In another example, the user modifies a parameter 102 defining a position of the virtual cloth object 101 within the virtual space. In yet another example, the user may select and drag, using the user interface 123, one or more nodes (vertices) of the initial mesh object 108 representing the virtual cloth object 101 to change a configuration of the virtual cloth object 101 in the virtual space. In some instances, the user interface 123 displays visual indications of the parameters 102 being defined and/or modified. For example, the user interface 123 can modify the appearance of the virtual cloth object 101 to corresponding to a selected material. (e.g. wool tweed, herringbone pattern). The user interface 123 displays, in some instances, a coarse mesh preview 108-0P object, and display one or more refined mesh objects (e.g. 108-1R for one or more values of 1, and 108-nR). The user interface 123 displays, in some instances, a modified coarse mesh preview 108-0M responsive to edits that the user interface 123 receives to the coarse mesh preview 108-0P.

As depicted in FIG. 1, the scene modeling system 110 can display a coarse mesh preview object 108-0P generated by the preview simulator subsystem 112 and can provide the user with control over the progressive cloth simulation. The coarse mesh preview 108-0P is generated so that a configuration of modified coarse mesh previews 108-0M generated responsive to edits to the coarse mesh preview 108-0P are consistent with a configuration of a refined finest resolution mesh object 108-nR that will be produced in a refinement simulation based on the modified coarse mesh preview 108-0M. A consistent configuration means that any folds, creases, indentions, or other geometrical features of a configuration of the modified coarse mesh preview 108-0M are consistent with corresponding features of a configuration of the refined finest resolution mesh object 108-nR. As depicted in FIG. 1, the scene modeling system 110 can enable the user to pause 105 the progress of the refinement simulation after any intermediate mesh preview (e.g. in the example depicted in FIG. 1, after a second refined intermediate mesh object 108-1R is generated). While the refinement simulation is paused, the user can, in some instances, perform a modification 105 of the parameters 102 to generate modified parameters 107 for the virtual cloth object 101. For example, modifying the parameters 102 can include changing a material of the virtual cloth object 101 (e.g. from cotton to wool), changing a position of the virtual cloth object 101 within the virtual space, and changing a configuration of the virtual cloth object 101 (e.g. by modifying the original mesh object 108 generated for the virtual cloth object 101). If the user changes the parameters 102 to modified parameters 107 or otherwise changes the configuration of the coarse mesh preview 108-0P, the scene modeling system 110 generates a modified coarse mesh preview 108-0M based on the changes and then restarts the refinement simulation using the modified coarse mesh preview 108-0M. For example, the refinement simulator subsystem 118 generates based on the modified parameters 107 of the virtual cloth object 101 and at each of a sequence of increasing mesh resolutions, the configuration of the mesh object 108, until a refined finest resolution mesh object 108-1R is determined. The user interface 123 can display, in some instances, one or more of the refined intermediate mesh objects 108-1R and the refined finest resolution mesh object 108-nR as these are determined. If the user does not change the parameters 102 or the configuration of the coarse mesh preview 108-0P, the user interface 123 displays the next refined intermediate mesh object 108-1R, or if the final mesh resolution has been reached in the refinement simulation, the user interface 123 defines the refined finest resolution mesh object 108-nR.

The scene modeling system 110, including the preview simulator subsystem 112, and the refinement simulator subsystem 118, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the scene modeling system 110 can be implemented using more or fewer systems or subsystems than those shown in FIG. 1, may combine two or more subsystems, or may have a different configuration or arrangement of the systems or subsystems.

Figure 3:
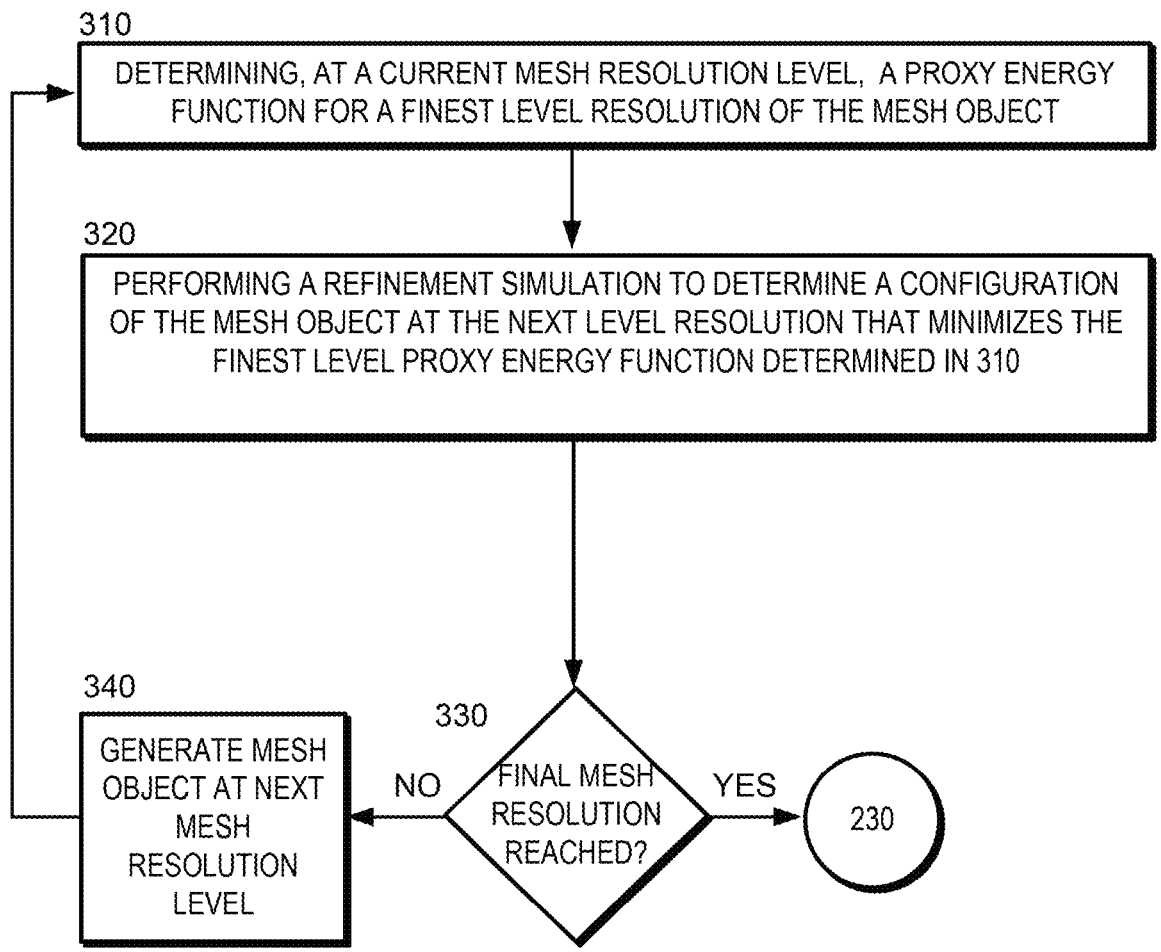
FIG. 3 depicts a method for conducting a refinement simulation and generating a preview object for use in the progressive cloth simulation of FIG. 2, according to certain embodiments disclosed herein.

Examples of Computer-Implemented Operations for Progressive Cloth Simulation for Generating an Overlaid Virtual Cloth Object In the embodiments described herein, the scene modeling system 110 can target a simulation of a high-resolution triangulated mesh with n nodes stored in a vector $x \in \mathbb{R}^{3n}$. The scene modeling system 110 provides controllable, expressive, and progressive modeling that obtains high-quality, fine resolution simulations of virtual cloth object 101 drape geometries, in any configuration, across a full range of real-world material parameters 102. For example a high-quality simulation is convergent, non-interpenetrating (not penetrating other objects in a virtual scene), and artifact-free. The scene modeling system 110 also provides previewing of the simulated virtual cloth object 101 (e.g. the overlaid virtual cloth object 103) utilizing a coarse-resolution preview object mesh, where a configuration of an edited coarse-resolution preview object mesh is consistent with a corresponding final, converged fine-level simulated configuration. Further, the scene modeling system 110 enables progressive resolution improvement of the result mesh starting from the coarse mesh preview object and ending with the converged, fine-mesh geometry. FIG. 2, FIG. 3, and FIG. 4 provide further details about these features.

FIG. 2 depicts an example of a method for generating an editable preview object for use in a progressive cloth simulation for generating an overlaid virtual cloth object 103, according to certain embodiments disclosed herein. One or more computing devices (e.g., the scene modeling system 110 or the individual subsystems contained therein) implement operations depicted in FIG. 2. For illustrative purposes, the method 200 is described with reference to certain examples depicted in the figures. Other implementations, however, are possible.

In certain embodiments described herein, the scene modeling system 110 is separate from the user computing device 120 and communicates with the user computing device 120 via the network 130. However, in some embodiments, the scene modeling system 110 is a component of the user computing device 120 and the operations described herein as performed by the scene modeling system 110 (or one or more of the subsystems 112 or 118 thereof) are performed by the modeling application 121 of the user computing device 120. In some embodiments, the scene modeling system 110 is separate from the user computing device 120 but one or more operations described herein as performed by the scene modeling system 110 (or one or more subsystems 112 and 118 thereof) are performed by the modeling application 121 of the user computing device 120.

At block 210, the method 200 involves accessing, by a scene modeling system 110, a virtual scene including a three-dimensional (3D) object 104 and a virtual cloth object 101. The 3D object 104 may be of a car, a human face, a building, clothing, a plant, or other object. The virtual cloth object 101 may be of a dish towel, a table cloth, a blanket, or other virtual cloth object 101. The 3D object 104, in some instances, can be displayed in a 3D virtual space. In some instances, the 3D virtual space represents an environment such as a room or an outdoor space. The 3D object 104 and the virtual cloth object 101 may each include defined dimensions, contours, or other information which defines a volume occupied by the 3D object 104 and the virtual cloth object 101 within the 3D virtual space. In some instances, the scene modeling system accesses the 3D virtual space including the 3D object 104 and the virtual cloth object 101 responsive to receiving a user input. For example, a user accesses the modeling application 121 (or a web browser application) executing on the user computing device 120, selects one or more objects on the user interface 123 of the user computing device to request to access the 3D object 104 and the virtual cloth object 101 or generate a new 3D object 104 and a new virtual cloth object 101. The scene modeling system 110 receives the inputs of the user and accesses the 3D object 104 and the virtual cloth object 101 responsive to receiving the user selection, and the scene modeling system 110 provides the 3D object 104 and the virtual cloth object 101 for display via the user interface 123 of the user computing device 120. In some instances, the user can position and/or reposition the virtual cloth object 101 and/or the 3D virtual object 104 within the virtual space using the user interface 123. For example, the user may place the virtual cloth object 101 above the 3D object 104 and request that a drape of the virtual cloth object 101 over the 3D object 104 be modeled by the scene modeling system 110.

At block 220, the method 200 involves performing, by the scene modeling system 110, a refinement simulation to model a drape of the virtual cloth object 101 over the 3D object 104, wherein performing the refinement simulation includes determining, at each of a sequence of increasing mesh resolutions of a mesh object 108 representing the virtual cloth object 101, a configuration of the mesh object 108, wherein the configuration of the mesh object 108 at each of the sequence of mesh resolutions minimizes a proxy energy function determined for a finest level mesh resolution. In some instances, the scene modeling system 110 receives a mesh object 108 that represents the virtual cloth object 101. In other instances, the scene modeling system 110 generates the mesh object 108 for the virtual cloth object 101.

In certain embodiments, the scene modeling system 110 constructs, for the sequence of increasing mesh resolutions, a nested triangle mesh hierarchy that includes mapping functions (e.g. prolongation operators) which map from one mesh resolution level to the next (finer) mesh resolution level. The nested triangle mesh hierarchy indexed in increasing resolution by subscript $l \in [0, L]$, where $x_l$ and $\bar{x}_l \in \mathbb{R}^{3n_l}$ are respectively the vectors of deformed positions and rest positions of the $n_l$ nodes in the mesh at level l, with corresponding triangulation indexed in $\mathcal{T}$. Deformed positions of nodes (vertices) corresponding to the coarsest mesh resolution are represented by $x_0$ and the positions of nodes in a target mesh corresponding to the finest mesh resolution of a converged, high-quality simulation output are represented by $x_L$. For the nested triangle mesh hierarchy, the scene modeling system 110 introduces linear prolongation (e.g. full column rank) operators that refine nodes from levels l to l+1 as $P_{l+1}^{l} \in \mathbb{R}^{3n_{l+1} \times 3n_l}$, while the corresponding, linear projection operators, determined using least squares (mapping nodes from levels 1 to l–1) are $\Pi_{l-1}{}^l = ((P_l^{l-1})^T (P_l^{l-1}))^{-1}(P_l^{l-1})^T$.

For each simulation mesh (at each of the sequence of mesh resolutions), the scene modeling system 110 determines potential energies which model physical properties of the virtual cloth object 101 with itself and/or with its environment. The potential energies can include a membrane interaction potential energy ($\Psi$), a bending interaction potential energy ($\Phi$), a contact barrier potential energy (B), a friction interaction potential energy (D), and, in some instances, a strain-limiting potential energy (S). In some instances, the scene modeling system 110 uses a neo-Hookean membrane and discrete hinge bending models to represent shell elastics, and C-IPC barriers for contact, friction, and strain-limiting interactions. The scene modeling system 110 simulates an equilibria of shells in frictional contact to represent the virtual cloth object 101, where stable equilibria of the discrete shell models are the local minimizers of the total potential energy, $$E_l(x) = E_l(x, \bar{x}, u) \quad (1),$$

where x and $\bar{x}$ represent finest-level quantities $x_L$ and $\bar{x}_L$, where $E_l$ is the sum of the potentials, $E_l = \Psi_l + \phi_l + B_l + D_l + S_l$, where u collects material and boundary condition parameters that can be varied by the user or by the modeling application 121. The scene modeling system 110 can determine a convergent and high-quality equilibrium solution with mesh geometry $x_l^*$ of the physics for each level l's spatial discretization that satisfies the constraint of $\|\Delta E_l(x^*_l)\| \le \epsilon$. For example, the scene modeling system 110 can use the Newton decrement norm from the C-IPC model. Progressive simulation should obtain these convergent solutions across wide variations in parameters 102 (e.g. material properties) and/or boundary conditions.

At block 230, the method 200 involves constructing, for display via a user interface 123, an editable preview object comprising a coarsest resolution of the mesh object, the editable preview object generated such that a configuration of a finest level mesh resolution of the mesh object generated via the refinement simulation is consistent with a configuration of the editable preview object and with any modifications to the configuration of the editable preview object. In some embodiments, the editable preview object (e.g. coarse mesh preview 108-0P object) is displayed via the user interface 123 and can be edited via the user. Edits include one or more changes to parameters 102 associated with the mesh object 108, for example, changes to the configuration of the coarse mesh preview 108-0P object. Changing the configuration can include changing a position of one or more nodes/vertices in the coarse mesh preview 108-0P object. Parameters 102 can also include a material of the virtual cloth object 101 being modeled by the coarse mesh preview 108-0P, one or more physical interactions of the virtual cloth object 101 with itself and with its environment (including interactions with the 3D virtual object 104) being modeled in the refinement simulation. Parameters 102, in some instances, can include material properties, boundary conditions (Dirichlet and collision geometries), external forces, and handles. The coarse mesh preview 108-0P object can be an interactive user interface 123 tool to allows interactive control of the virtual scene via manipulation, creation, and deletion of handles and collision geometries, as well as updates to material parameters. In some embodiments, the coarse mesh preview 108-0P object includes transform widgets to control colliders and handles and to support rotation, scaling (uniform and non-uniform) and translation to manipulate the virtual cloth object 101 drape and setting. In some embodiments, the coarse mesh preview 108-P includes a menu of drop down presets corresponding to materials (e.g. cotton, heavy wool, light wool, wool tweed, silk, and any other material categories that can be modeled) and an option to custom-tune material parameters to refine a drape or to apply alternate materials.

Upon each edit received via the user interface 123 to the coarse mesh preview 108-0P object, the preview simulator subsystem 112 generates a modified coarse mesh preview 108-0M using a progressive preview simulation 106. Each time the user edits a mesh preview object (either the initial coarse mesh preview 108-0P object or one or more subsequent modified coarse mesh preview 108-0M objects), the scene modeling system 110 reverts to a cached coarse solution, changes the parameters 102 in accordance with edits made by the user, and restarts a progressive simulation. Handle and geometry transformations performed on the coarse mesh preview 108-0P object are applied immediately are communicated to the simulation as target goals for boundary condition constraints and penalty energy, and are satisfied incrementally by stepping the underlying preview simulator, which includes both collision geometry and cloth simulation domains, towards the target goals. Accordingly, the coarse mesh preview 108-0P object allows for unconstrained live editing of the virtual cloth object 101 and colliders while also guaranteeing intersection-free final state for a drape of the virtual cloth object 101 at all levels of progressive refinement to ensure a high-quality output.

Accordingly, the embodiments described herein, the scene modeling system 110 provides two simulations: a refinement simulation 109 and a preview simulation 106. In a refinement simulation 109 ($x_l^t \to x_{l+1}^t$), the refinement simulator subsystem 118 performs a progressive spatial improvement of the solution (the configuration of the nodes/vertices of the mesh object 108) from mesh resolution level l to mesh resolution level l+1, for a fixed set of conditions $u^t$. In a preview simulation 106 ($x_l^t \to x_l^{t+1}$), the preview simulation subsystem 112 performs a quasi-static advancement of the solution at mesh resolution level l, from time step t to t+1, over a possibly varying set of conditions u, until an equilibrium preview configuration is reached upon which a refinement simulation 109 can be performed. Refinement simulation 109 ensures progressive improvement, with consistency, towards a converged fine-level solution for fixed conditions $u^t$, given at a time t. The preview simulation 106 continues the complementary, forward exploration over continued changes in conditions encoded in time-varying parameters 102, $u^t \to u^{t+1}$.

In certain embodiments, the scene modeling system 110, given a current, nonequilibrium configuration of the mesh object 108, $x^t$, can step towards a stable state by time stepping a gradient flow with an implicit Euler method. Applying large time steps, h (e.g. h∈[0.05,0.5s]) to enhance the implicit Euler's numerical dissipation, which amounts to computing forward quasi-static position updates from time steps t to t+1 by a minimization of an updated incremental potential, which can be represented as:

$$x^{t+1} = \operatorname{argmin}\_x \frac{1}{2h^2} \|x - x^t\|_M^2 + E(x, \bar{x}, u^{t+1}), \quad (2)$$

where $x^t$ represents a last step's simulated shape and $u^{t+1}$ collects the time-varying scene parameters that drive forward change by moving configurations of the mesh object 108 out of equilibrium in the simulation steps. For an unchanged u, time stepping can be repeated until $x^{t+1}=x^t$ and so a new equilibrium is reached. In this example, the superscripts t on nodal vectors index quasi-static time stamps.

In certain embodiments described herein, the scene modeling system 110 provides a one-way nonlinear multiresolution solver that provides, at each step t, a sequentially improving hierarchy of self-consistent preview simulation solutions, $x_0^t \approx \Pi_0^t$, $x_l^t \ldots , \Pi_l^{l+1} x_{l+1}^t, \ldots , x_{L-1}^t \approx \Pi_{L-1}^L x_L^t$, where $x_0^t$ represents a coarsest mesh resolution of the mesh model 108, $x_l^t$ represents an intermediate mesh resolution of the mesh model 108, and $x_{L-1}^t$ represents mesh resolution of the mesh object 108 that precedes the finest mesh resolution. The final, finest mesh resolution solution is a converged solution of the underlying cloth model, $\|\nabla E_l(x^*_l)\| \leq \varepsilon$. Also, each individual solution $x_l^t$, at all levels, l, of resolution between the coarsest, 0, and the finest, L, (l ∈ [0, L]) independently provides a stable solution for forward simulation.

Further details for providing a progressive cloth simulation simulating a drape of the virtual cloth object 101 over the 3D object 104 using the scene modeling system 110 are described in FIG. 3 and FIG. 4.

At block 240, the method 200 involves displaying, via a user interface 123, the virtual cloth object overlaid over the 3D object 104 using the configuration of the mesh object 108 determined in the refinement simulation at the finest mesh resolution, based on the edit to the editable preview object. For example, the scene modeling system 110 displays the overlaid virtual cloth object 103, which is draped over the 3D object 104, having folds, creases, and other contours corresponding to the contours of the surface of the refined finest resolution mesh object 108-nR. In some instances, a user can alternate between a view of the cloth object and the refined finest resolution mesh object 108-nR by selecting one or more objects of the user interface.

FIG. 3 depicts an example of a method for conducting, in the progressive cloth simulation of FIG. 2, a refinement simulation and a preview simulation for each of a sequence of mesh resolutions, according to certain embodiments disclosed herein. One or more computing devices (e.g., the scene modeling system 110 or the individual subsystems contained therein) implement operations depicted in FIG. 3. For illustrative purposes, the method 300 is described with reference to certain examples depicted in the figures. Other implementations, however, are possible.

In certain embodiments described herein, the scene modeling system 110 is separate from the user computing device 120 and communicates with the user computing device 120 via the network 130. However, in some embodiments, the scene modeling system 110 is a component of the user computing device 120 and the operations described herein as performed by the scene modeling system 110 (or one or more of the subsystems 112 or 118 thereof) are performed by the modeling application 121 of the user computing device 120. In some embodiments, the scene modeling system 110 is separate from the user computing device 120 but one or more operations described herein as performed by the scene modeling system 110 (or one or more subsystems 112 and 118 thereof) are performed by the modeling application 121 of the user computing device 120. In certain embodiments, the method 300 is a method for implementing block 220 of FIG. 2.

At block 310, the method 300 involves determining, by the refinement simulator subsystem 118 at a current mesh resolution level, a proxy energy function for a finest level resolution of the mesh object 108. At each level l<L (where L is the finest mesh resolution), the refinement simulator subsystem 118 constructs a mixed resolution objective function, $$F_l(x_l) = C_l(x_l) + G(P^l x_l) \quad (3)$$

where the function is a proxy energy for the finest-level resolution (L) of the mesh. In Equation (3), $x_l$ represents the spatial configuration of the nodes/vertices of mesh object 108 at the current mesh resolution, $C_l(x_l)$ represents barrier-based potentials, and G ($P^l x_l$) represents shell membrane and bending potentials. For example, the refinement simulator subsystem 118 begins at the coarsest mesh resolution level l=0 and determines the proxy energy function (Equation 3) for the coarsest mesh resolution level. The barrier-based potentials $C_l(x_l)$ can be collected in:

$$C_l(x_l) = B_l(x_l) + D_l(x_l) + S_l(x_l) \quad (4),$$

where $B_l(x_l)$ represents contact barrier interactions, $D_l(x_l)$ represents friction interactions, and $S_l(x_l)$ represents strain-limiting interactions. The shell membrane and bending potentials can be represented as:

$$G(P^l x_l) = \Omega(P^l x_l) + \Phi(P^l x_l) \quad (5),$$

where $\Psi(P^l x_l)$ represents membrane potentials and $\Phi(P^l x_l)$ represents bending potentials, evaluated at the finest mesh resolution level (L), using repeated prolongation to the finest scale, $P^l x_l = P_L^{L-1} \ldots P_{l+1}^l x_l$. Accordingly, the refinement simulator subsystem 118 enforces contact and strain-limit feasibility on the current mesh resolution level's (l) geometry and shell membrane and bending potentials. The refinement simulator subsystem 118 also can determine an inertial energy K at a current mesh resolution level (l) as:

$$K_l(x_l, y_l) = \frac{1}{2h^2} \|x_k - y_l\|_{M_l}^2, \quad (6)$$

to promote continuity across quasi-static time steps (effective step size h) and spatial consistency across resolutions during refinement. The free parameter $y_l$ differs based on the current time step and simulation mode.

At block 320, the method 300 involves performing a refinement simulation to determine a configuration of the mesh object at a next level mesh resolution that minimizes the finest level proxy energy function determined in block 310. To progress from a current mesh resolution level l−1 to a next level l (between 1 and L−1, where L is the finest mesh resolution level), at a fixed time step t+1, the refinement simulator subsystem 118 accesses a previous mesh resolution level's equilibrium solution (a configuration for the mesh object 108) for parameters $u^{t+1}$ given by $x_{l-1}^{t+1}$. The refinement simulator subsystem 118 solves for a local minimizer (an equilibrium) of the proxy energy:

$$x_l^{t+1} = \text{argmin}\_x_l(F_l)(x_l) \quad (7)$$

In certain embodiments, to solve for the local minimizer represented by Equation (7), the refinement simulator subsystem 118, constructs a custom, Newton-type descent method. However, not all minima are equally acceptable and the initialization of the Newton solve is critical to progressive improvement in each mesh resolution level's optimization. There are two key and competing requirements for initialization. First, nonconvexities of the shell and contact potentials imply that each level's energy supports many equally physically valid minima (e.g., consider period shifts in cloth folds). In turn, successive Newton iterations descend to a local minima in a basin containing their initializer.

Second, to obtain a feasible (nonintersecting and strain-limit-satisfying) minimizer, is it is necessary to have a correspondingly feasible initializer, which may not be satisfied by an otherwise ideal choice. Accordingly, in some embodiments, the refinement simulator subsystem 118 biases each new level's minimizer to be near to the last level's prolonged solution, $x_l^P = P_l^{l-1} x_{l-1}^{t+1}$. However, while the prolonged solution $x_l^P$ may be an ideal choice to bias the minimization process towards consistency for l>0, while all coarsest deformations, $x_0^P$ (mesh resolution level 0), remain feasible at a start of refinement with the presumption that the starting, coarsest configuration $x_0^{t=0}$ of the mesh model 108, are feasible.

In certain embodiments, the refinement simulator subsystem 118 begins with a feasible initial state at a very first time step of a preview simulation (e.g. coarse mesh preview 108-0P depicted in FIG. 1). All following time steps must remain feasible throughout and, as barrier based methods are employed, all iterates within the Newton solver will also preserve feasibility. All successive optimizations of the proxy energy function $F_l$, for mesh resolutions greater than the coarsest level (l>0), also initialize their Newton solve with a safe prolongation of $x_{l-1}^{t+1}$. Given the solution $x_{l-1}^{t+1}$ at level l−1, the prolonged solution $x_l^P = P_l^{l-1} x_{l-1}^{t+1}$ is used as a target to initialize a next solve of the level l proxy energy (shown in Equation (3)). However, even though prolonged solution $x_l^P$ is mapped from a level l−1 feasible point, no guarantees exist that the prolonged solution will satisfy non-intersection conditions at the next level l. To construct a close-by, feasible initializer, the refinement simulator subsystem 118 determines a safe starting point $x_l^s$, at level l, that is guaranteed to be feasible and then searches along $d = x_l^P - x_l^s$ to find, using continuous collision detection, a closest feasible point to the unconstrained prolongation $x_l^P$. To compute the safe start, the refinement simulator subsystem 118 applies a barycentric upsampling, $x_l^s = U_l^{l-1} x_{l-1}^{t+1}$ to match the next level's mesh connectivity. Non-intersection constraints are preserved in this safe start computation because the computation is a purely topological update that does not affect the carrier geometry.

In some instances, directly applying a projected Newton's method to solve each optimization of the proxy energy using Equation 7 would require the computation at each iteration of the n×n global Hessian contribution, $\nabla^2 G(P^l x_l)$, from the bending and membrane energies. Combining from its subsequent reduction to $(P^l)^T \nabla^2 G(P^l x_l) P^l$, this would further result in evaluation, assembly, and linear-solve costs comparable to that of the original, fine-level model solve. Further, waiting for a final result of this potentially costly optimization per mesh resolution level, with no intermediate preview of output, means that significant time and computational resources could be wasted during refinement that could instead be used on new parameter explorations. To provide intermediate and stable updates for previewing (and therefore opportunities to change parameters) during each level's refinement, the mesh refinement subsystem 118 applies quasi-static stepping via approximate solves of the incremental potentials formed by the sum of the proxy energy and the inertial energy ($F_l + K_l$). To solve each such proxy step, the mesh refinement subsystem 118 applies an inexact Newton solve by preconditioning the proxy and inertial energies' gradient with the projected Hessian of the unmodified, coarse-model's incremental potential ($E_l + K_l$). This process scales all barrier gradients with their corresponding second-order information, while using the sparse, coarse membrane and bending Hessians to approximate the second-order information for their fine-level counterparts' gradients. This process results in rapid, Newton-like convergence, close to that of directly solving a coarse-mesh optimization with Newton iteration. The overhead for solving the proxy energy, over that of a standard coarse-mesh time-step solve, is then just the easily parallelized gradient and energy evaluations of the fine-level membrane and bending energies. Each individual proxy step need not be solved accurately. In some instances, a single iteration per proxy step solve provides both rapid convergence to equilibria as well as stable, easily interruptible, intermediate previews during refinement.

At block 330, the method 300 involves determining, by the refinement simulator subsystem 118, whether a final mesh resolution has been reached. For example, the finest level mesh resolution can be a predetermined resolution n, as depicted in FIG. 1.

If the refinement simulator subsystem 118 determines that a final mesh resolution has not been reached, the method 300 proceeds to block 340.

At block 340, the method 300 involves generating, by the refinement simulator subsystem 118, generates a mesh object 108 at a next mesh resolution level. For example, from the coarsest mesh resolution level, the mesh resolution level proceeds to a finer, intermediate mesh resolution level. Increasing the mesh resolution level includes increasing a number of triangles in the mesh object 108. In certain embodiments, the refinement simulator subsystem 118 generates the next-resolution-level mesh object 108 in accordance with the nested triangle mesh hierarchy. For example, the nested triangle mesh hierarchy is indexed in increasing resolution by subscript $l \in [0, L]$, where $x_l$ and $\bar{x}_l \in \mathbb{R}^{3n_l}$ are respectively the vectors of deformed positions and rest positions of the $n_l$ nodes in the mesh at level l, with corresponding triangulation indexed in $\mathcal{T}_l$. Deformed positions of nodes (vertices) corresponding to the coarsest mesh resolution are represented by $x_0$ and the positions of nodes in a target mesh corresponding to the finest mesh resolution of a converged, high-quality simulation output are represented by $x_L$. For the nested triangle mesh hierarchy, the scene modeling system 110 introduces linear prolongation (e.g. full column rank) operators that refine nodes from levels l to l+1 as $P_{l+1}^l \in \mathbb{R}^{3n_{l+1} \times 3n_l}$, while the corresponding, linear projection operators, determined using least squares.

From block 340, the method 300 returns to block 310. For example, the method 300 involves repeating blocks 310, 320, 330, and 340 until a configuration of the mesh object 108 is determined that minimizes a proxy energy function determined for a finest-level mesh resolution.

FIG. 4 depicts method for providing user control over a progressive cloth simulation using a preview simulation 106 and an editable preview object, according to certain embodiments disclosed herein. One or more computing devices (e.g., the scene modeling system 110 or the individual subsystems contained therein) implement operations depicted in FIG. 4. For illustrative purposes, the method 400 is described with reference to certain examples depicted in the figures. Other implementations, however, are possible.

In certain embodiments described herein, the scene modeling system 110 is separate from the user computing device 120 and communicates with the user computing device 120 via the network 130. However, in some embodiments, the scene modeling system 110 is a component of the user computing device 120 and the operations described herein as performed by the scene modeling system 110 (or one or more of the subsystems 112 or 118 thereof) are performed by the modeling application 121 of the user computing device 120. In some embodiments, the scene modeling system 110 is separate from the user computing device 120 but one or more operations described herein as performed by the scene modeling system 110 (or one or more subsystems 112 and 118 thereof) are performed by the modeling application 121 of the user computing device 120.

In certain embodiments, the method 400 can be performed alongside the method 300 (the refinement simulation 109), and provide a level of user control over the refinement simulation 109 by providing an editable preview object (e.g. coarse level mesh preview 108-0P object depicted in FIG. 1). A user can make changes to the editable preview object by updating parameters 102 including material properties of the virtual cloth object 101, a configuration of the nodes of the editable preview object, physical interactions, or other parameters 102. When the scene modeling system 110 receives a modification to the parameters 102, the preview simulator subsystem 112 can scene modeling system 110 can interrupt the current refinement simulation 109 and perform a preview simulation 106 to generate a modified mesh preview 108-0M that has a configuration that is consistent, at the coarsest mesh resolution level, with a configuration of a refined finest resolution mesh object 108-$n$R that can be produced using a subsequent refinement simulation 109. The scene modeling system 110 can then commence the subsequent refinement simulation 109 using the modified mesh preview 108-0M object.

At block 410, the method 400 involves displaying, by the preview simulator subsystem 112 via a user interface 123 during a refinement simulation 109, an editable preview object. For example, the editable preview object is the coarsest level mesh preview 108-0P object and the refinement simulation 109 is being performed according to method 300 described herein. In certain embodiments, coarsest level mesh preview 108-0P object is generated based on the mesh object 108 that represents, a coarsest level mesh resolution, the virtual cloth object 101. The coarsest level mesh preview 108-0P object has a configuration that is determined to minimize a proxy energy function for a finest level mesh resolution of the mesh object 108 (e.g. determined in block 310 of FIG. 3.), and which is mapped using a nested triangle hierarchy (e.g. as described in block 220 of FIG. 2).

At block 420, the method 400 involves determining, by the preview simulator subsystem 112, whether the user has changed parameters 102 using the editable preview object. For example, the preview simulator subsystem 112 provides, via the user interface 123, one or more menus or other user interface objects that enable the user to change the parameters 102, which can include a configuration of nodes/vertices in the mesh object 108 representing the virtual cloth object 101, a material of the virtual cloth object, physical interactions of the virtual cloth object 101 with itself and its environment (including with the 3D virtual object 104), and other parameters 102.

If the preview simulator subsystem 112 does not receive a change to the parameters 102, the method 400 proceeds to block 425.

At block 425, the refinement simulator subsystem 119 continues to perform a current refinement simulation 109.

From block 425, the method returns to block 420. For example, at blocks 420 and 425, the scene modeling system 110 continues to monitor for edits to the editable preview object (e.g. edits to the parameters 102) while the refinement simulation 109 continues to proceed.

In some embodiments, parameters 102 can include hard positional constraints including Dirichlet boundary conditions. When applied, Dirichlet boundary conditions (BC) specify a subset of positionally constrained vertices/nodes $\mathcal{B} \subset [1, n]$. Every vertex $x_k$, $k \in \mathcal{B}$, has a target position $\bar{x}_k$. In a first Newton iterate of each step's solve, the scene modeling system 110 checks the full step by taking all bound vertices in $\mathcal{B}$ to their prescribed targets. Using a step-size filtering, the scene modeling system 110 determines a largest possible feasible size step towards the targets and applies it to update all bound vertices. The scene modeling system 110 determines simple, adaptive quadratic penalties to an objective:

$$P(x_k, t) = \frac{\kappa_B}{2} m_k \|x_k - \bar{x}_k^{t+1}\|^2, \tag{8}$$

where $m_k$ is vertex k's lumped mass. Penalty stiffness $K_B$ is adaptively increased by 2× whenever a current Newton iterate is close to convergence (via norm of gradient measure) and current targets are not satisfied. Alternatively, if the current iterate satisfied the time step's targets, the scene modeling system 110 fixes the bound vertices to their target positions, discards P from the objective and continues Newton iteration until convergence.

In some embodiments, parameters 102 can include soft-positional constraints. For example, the scene modeling system 110 can explore physical arrangement and placement of the mesh object 108 over a sequence of time-stepped deformations. The scene modeling system 110 can soft-bind handles to boundary conditions (BC), unlike hard boundary conditions described previously, which allows scripted and interactive exploration of time-varying BC. In some instances, application of handles applies a sequence or online stream of per-time step target locations $\bar{x}_k^{t+1}$. In some instances, resolving the target locations per time step is similar to the process for hard BC, however, rather than adapting the penalty stiffness, the penalty stiffness is fixed is fixed to the bound material's Young's modulus.

In some embodiments, parameters 102 can include collision geometries. Cloth model interaction with time-varying collision geometries provides an intuitive and effective means of manipulating cloth drape. Collision geometries are meshes with fully prescribed vertex motion per step and utilize the same penalty energy, P, described in Equation (5) when moving, while fixing their locations with hard positional constraints when not moving, without need of membrane and bending energies.

In some embodiments, parameters 102 including adding nested cages. While collision geometries can be treated directly, nested cages can also be used and refined in tandem with a primary simulation mesh. The nesting property of nested cages allows for safe swapping of each new refined nested collision geometry from a previous nested collision geometry while preserving a safe initialization.

In some embodiments, parameters 102 include material parameters so that material changes can be explored. The scene modeling system 110 can enable direct, smooth changes per step over variation of cloth material moduli (both Young's and Poisson) in membrane and bending energies, material thickness (which provides a direct change in bending stiffness), density, and frictional coefficients in a contact model for varying surface-to-surface stick and slip behaviors.

In some embodiments, parameters 102 include external and body forces such as gravity and inflation and these can be added and modified.

Returning to block 430, if the preview simulator subsystem 112 receives a change to the parameters 102, the method 400 proceeds to block 440. For example, if the user changes the parameters 102 of the virtual cloth object 101 or changes a configuration of nodes in the editable review object, the preview simulator subsystem 112 will execute a preview simulation 106. For example, the original parameters 102 indicate a light wool material and the modified parameters 107 indicate a heavy wool material. In another example, the original parameters 102 indicate a first configuration of nodes and the modified parameters 107 indicate a second configuration of nodes that is geometrically different from the first configuration. In another example, the original parameters 102 indicate that four specific physical interactions will be modeled and the modified parameters 107 add a fifth physical interaction to the original parameters 102.

At block 440, the preview simulator subsystem 112 pauses the current refinement simulation 109 and performs a preview simulation 106 based on the modified parameters 107 to generate a modified coarsest level preview object 108-0P, wherein a configuration of the modified coarsest level preview object 108-0P minimizes a proxy energy function for the finest level mesh resolution of the mesh object 108. The preview simulator subsystem 112 can perform a preview time step from a current time step t to a next time step t+1 at the current mesh resolution level l<L by beginning with the prior feasible state $x_l^t$ for the same mesh resolution level. In some instances, the prior feasible state is retrieved from a prior time-step solve or is retrieved from solution cached at the start of the last refinement simulation 109. The preview simulator subsystem 112 performs quasi-static time stepping towards equilibrium of the proxy energy with updates in parameters u (102) applied at the start of each time step's solve. For progressive preview simulation 106, the preview simulator subsystem 112 time steps previews at a coarsest level (l=0), and then sequentially moves from preview solution $x_0^t$ to $x_0^{t+1}$ with each step's (possibly updated) material and boundary condition parameters, $u^{t+1}$. The preview simulation subsystem 112 continues this process until, at some time t, an equilibrium preview configuration, $x_0^t$, is reached, which corresponds to a modified coarse mesh preview 108-0M, which can be displayed to a user.

From block 440, the method 400 proceeds to block 310 of FIG. 3. For example, the refinement simulator subsystem 118 performs a refinement simulation 109 using the modified mesh preview 108-0M object as a starting point. For example, after the equilibrium solution of block 430 is reached using the preview simulation 106, the refinement simulator subsystem 118 triggers a subsequent refinement simulation 109 to sequentially solve across increasing resolution levels l∈[1, L], according to the method 300 of FIG. 3, using the modified mesh preview 108-M0 object as a starting point. At each mesh resolution level's solution, the refinement subsystem 118 passes the respective solution, via safe prolongation, on to the next mesh resolution level. In some embodiments, the subsequent refinement simulation 109 can be interrupted via user interaction by changing parameters 102. If the user changes the parameters 102 during the subsequent refinement simulation 109, a subsequent preview simulation 106 can be performed to generate a subsequent modified mesh preview 108-0M object. However, if the user is satisfied and makes no further changes to the parameters 102 (using the modified mesh preview 108-0M object) during the subsequent refinement simulation 109, the refinement simulator subsystem 118 eventually reaches the finest mesh resolution level L. The refinement simulator subsystem 118 generates the refined finest resolution mesh object 108-nR, which minimizes the target finest-level total energy, E, via quasi-static stepping of the fine-level incremental potential. On convergence, the scene modeling system 110 reaches a consistent refined finest resolution mesh object 108-nR ($x_L^t$), which satisfies the equilibrium, $\|\nabla E(x_L^t)\| < \epsilon\|$, at the finest mesh resolution level L, for parameters 102 ($u^t$).

In some embodiments, to minimize barrier energies, the scene modeling system 110, prior to performing energy-based evaluations with barriers, applies a proximity detection method to compute constraint sets that define non-zero barrier energies for all surface-to-surface primitive pairs that are closer than a predefined threshold. Further, the scene modeling system 110 can apply step-size filtering to find, via continuous collision detection and strain evaluation, largest possible feasible size steps along prescribed nodal displacement vectors that will ensure strain-limits and non-intersection conditions are maintained.

In the embodiments described herein, minimizers $x_l$, of both preview and refinement time steps are stable forward integrations with an implicit Euler method. For example, each solution's optimality gives:

$$x_l = y_l - h^2 M_l^{-1} \nabla C(x_l) - h^2 M_l^{-1} P^{l^T} \nabla G(P^l x_l) \qquad (9),$$

which is the implicit Euler update of a first-order system. This perspective additionally offers the interpretation of membrane and bending energy forces as reduced-order models with the prolongation operator as basis. Steps with $y_l = x_l$ are forward quasi-static time steps updating from a last configuration. Initial refinement steps, with $y_l = P_l^{l-1} x_{l-1}^{t+1}$, are implicit Euler steps updating from mesh resolution level l−1 to level l. In some instances, the use of an implicit Euler method, together with an application of a large time step size, h, ensures stable, strongly dissipative steps that quickly pull each step towards an equilibrium solution. In certain embodiments, the scene modeling system 110 uses aggressively small numbers (in some cases, single) iterates per step and maintains stability and rapid convergence to equilibria while offering immediate feedback via the user interface 123 at each update on the evolving solution (e.g. generated in the refinement simulation 109) at each mesh resolution level of refinement. By using the methods described herein, the scene modeling system 110 guarantees a decrease in potential energy (via line-searching), preserves non-intersection and strain-limits (via step-size filtering), while inertial energy provides quadratic damping, maintaining consistency across steps. In some instances, irrespective of a number of iterations applied per step, convergence to equilibrium is achieved when an applied step converges to tolerance at a start of its first iteration.

Figure 5:
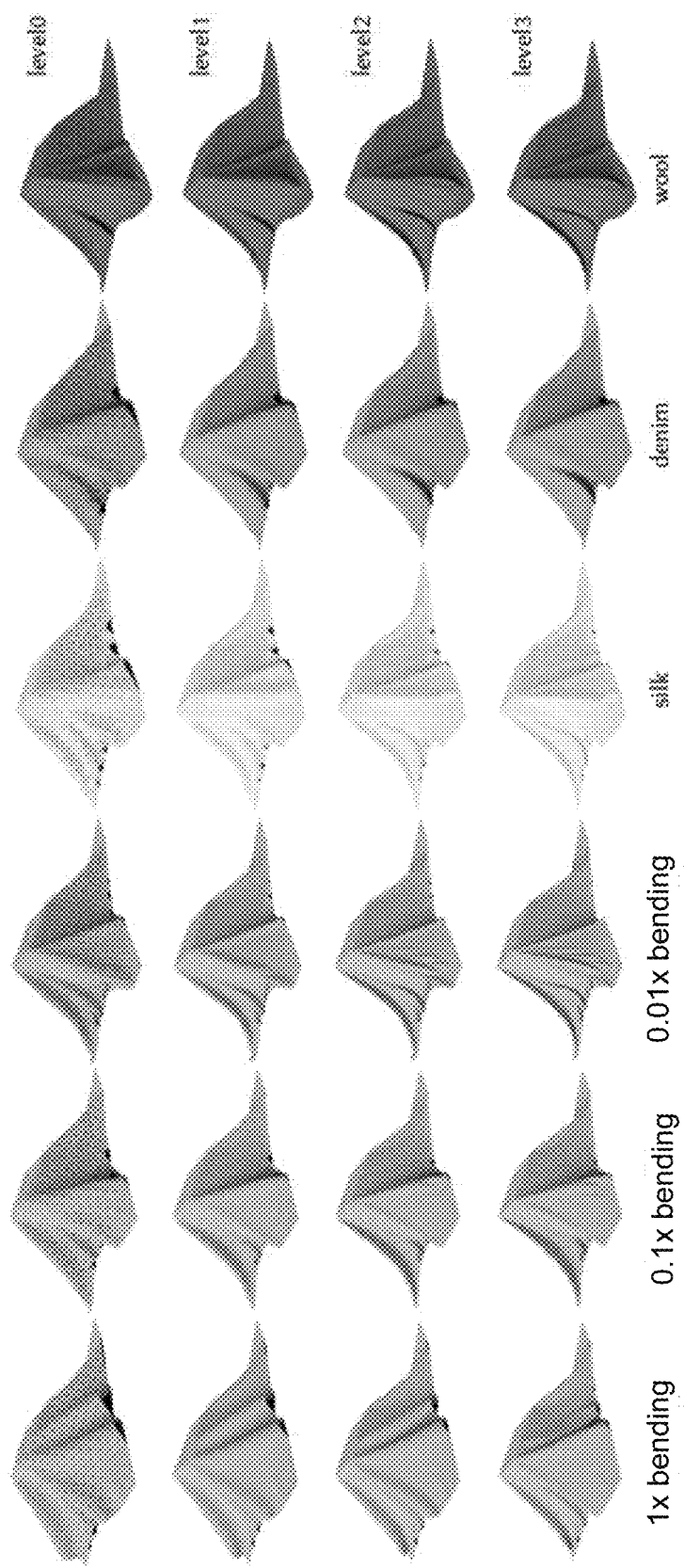
FIG. 5 illustrates an effect of changing a material property using a preview object on a finest level refined mesh generated in a refinement simulation, according to certain embodiments described herein.

FIG. 5 illustrates an effect of changing a material property using a preview object on a finest level refined mesh generated in a refinement simulation, according to certain embodiments described herein. For example, the scene modeling system displays a coarse mesh preview 108-0P of a mesh object 108 and receives a modification to the parameters 102 via the coarse mesh preview 108-0P. In the example depicted in FIG. 5, the scene modeling system 110 receives a modification to a material (1× bending, 0.1× bending, 0.01> bending, silk, denim, and wool, where the x-bending materials are varying thicknesses of a same material). FIG. 5 shows a refinement simulation 109, proceeding from top to bottom in each column, which progresses through three mesh resolutions starting from a modified coarse mesh preview 108-0M associated with each of the selected parameters (level 0) through intermediate mesh resolutions (level 1, level2) until a refined finest resolution mesh object 108-$n$R is obtained at a finest mesh resolution (level3). As shown in FIG. 5, each selected material exhibits distinctive wrinkling behavior.

Figure 6:
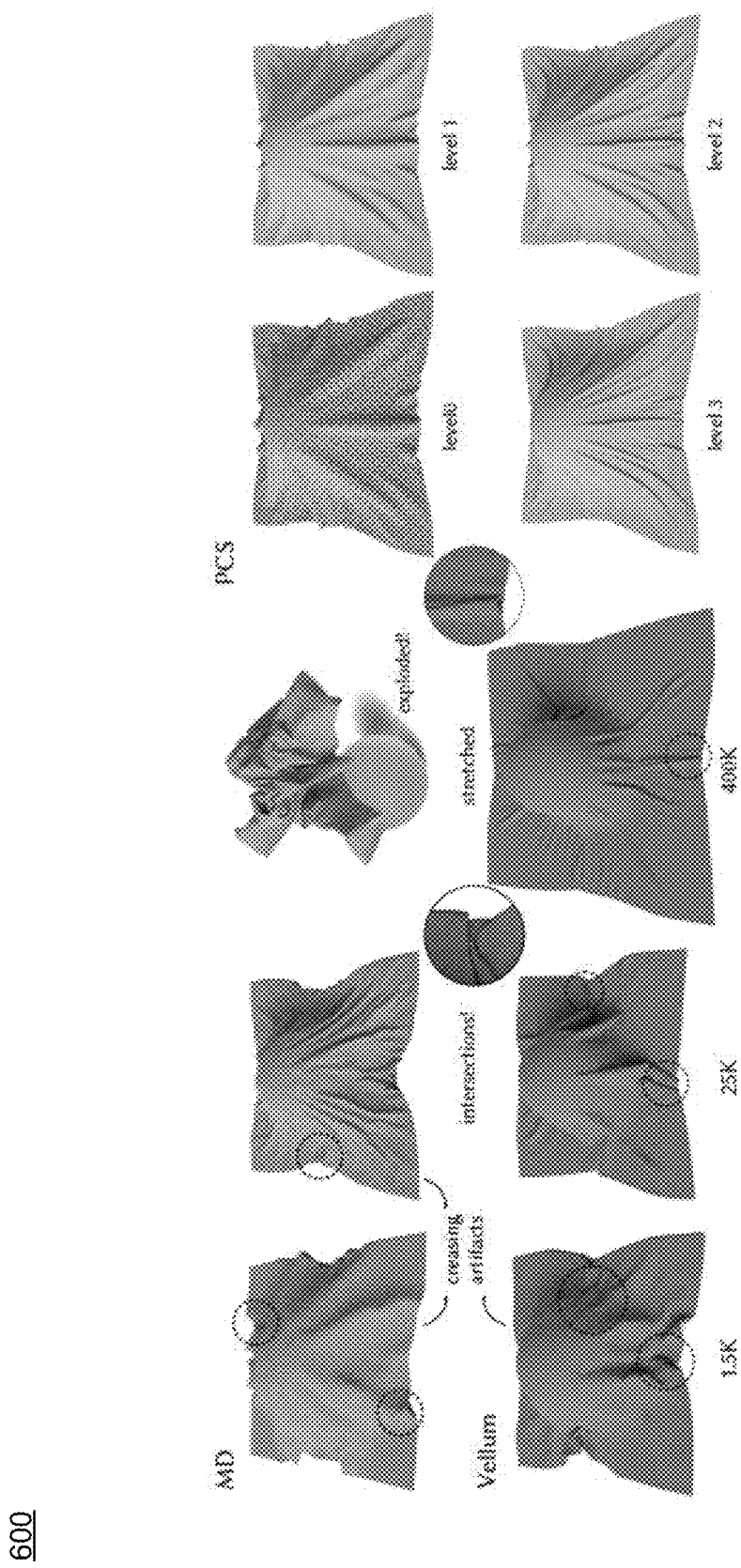
FIG. 6 illustrates a comparison between results of the progressive cloth simulation described herein and conventional cloth simulation methods, according to certain embodiments described herein.

FIG. 6 illustrates a comparison 600 between results of the progressive cloth simulation described herein and conventional cloth simulation methods, according to certain embodiments described herein. FIG. 6 illustrates, on the left half of FIG. 6, at three mesh resolutions 1.5K, 25K, and 400K, a refinement of conventional simulation models Marvelous Designer (MD) and Vellum. As illustrated in FIG. 6, designing with conventional simulation models, which involve progressive resolution of coarse cloth meshes, can lead to undesirable and unpredictable outcomes. For example, both MD and Vellum conventional models produce numerous undesirable creasing artifacts at low mesh resolutions, which are absent in the coarse level (level0) mesh of the progressive cloth simulation described herein (PCS), because the PCS described herein uses fine-scale cloth forces. Furthermore, trying to increase a resolution of coarse cloth designs leads to unpredictable results in conventional cloth simulation models. For example, both MD and Vellum conventional models exhibit dramatically different folds across resolutions, as well as artifacts such as intersections and inconsistent material stretching in Vellum, and explosive instabilities in MD, as shown in FIG. 6. In contrast, the progressive cloth simulation described herein (PCS) achieves a high-fidelity fine-scale cloth simulation across various mesh resolution levels (level 1, level 2, level 3) which is consistent with the interactive coarse mesh (level 0 mesh, which is a coarse mesh preview 108-0P object) and is free of artifacts.

Figure 7:
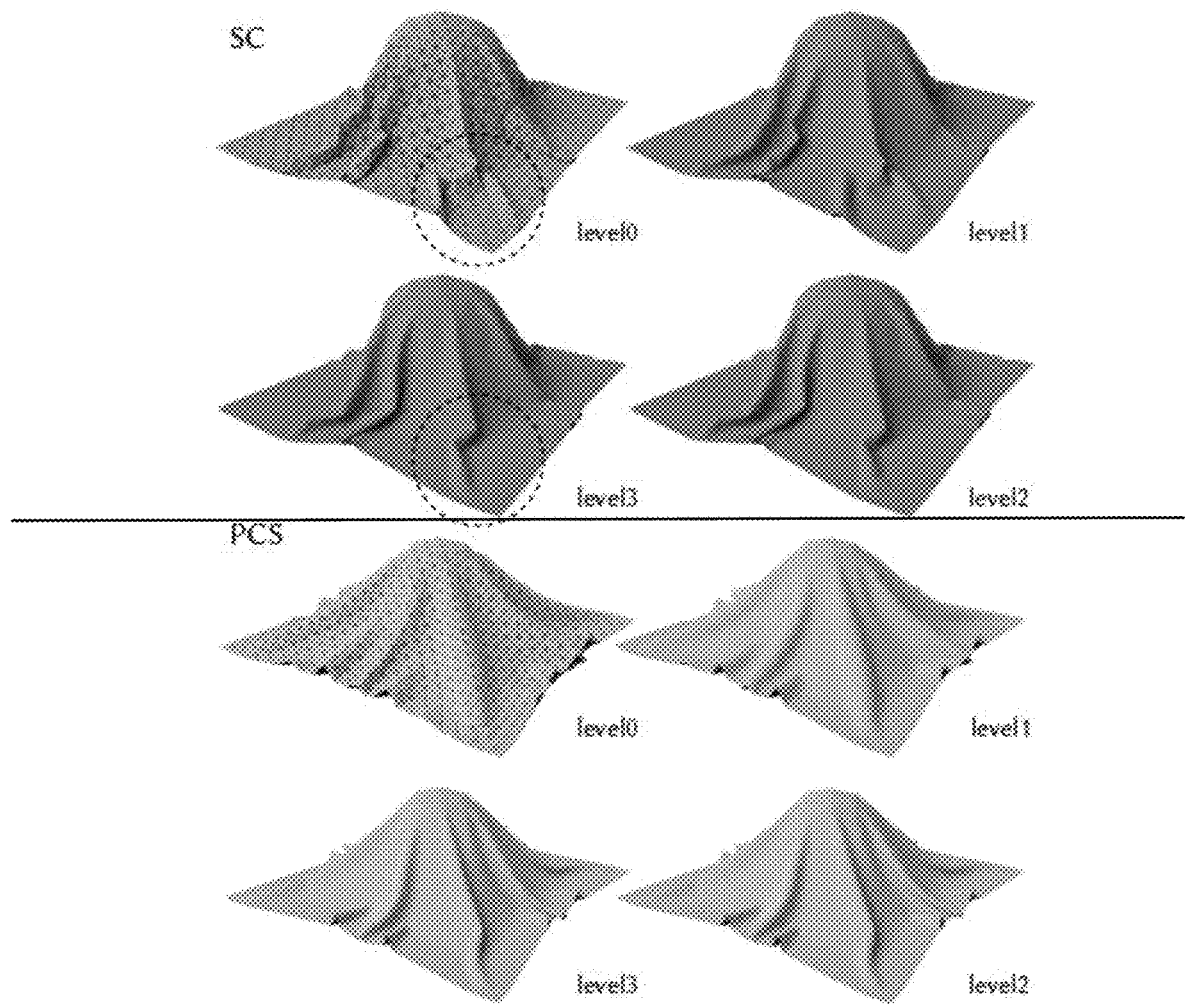
FIG. 7 illustrates another comparison between results of the progressive cloth simulation described herein and conventional cloth simulation methods, according to certain embodiments described herein.

FIG. 7 illustrates another comparison between results of the progressive cloth simulation described herein and conventional cloth simulation methods, according to certain embodiments described herein. As shown in FIG. 7, conventional cloth simulation models such as the Sensitive Couture (SC) model, whose results are shown in the top half of FIG. 7 across mesh resolution levels level1, level2, and level3 from a starting coarse mesh preview object 108-0P at level0, can suffer from inconsistent folds across mesh resolution levels. For example, the crumpled corner on mesh resolution levels 0 of 1 in the conventional SC model bifurcate into a different fold in mesh resolution levels 2 and 3.

In contrast, the PCS methods described herein, the results of which are depicted in the bottom half of FIG. 7, ensure multi-level consistency so that the original coarse-scale folds at level 0 are progressively refined in a faithful and predictive manner across levels 1, 2, and 3. Further, PCS avoids locking artifacts in both coarse and fine results while obtaining consistent larger-scale fold geometries that refine with finer-detail wrinkling and softer folds compared to SC, as progress is made toward the finest level high-quality result.

Examples of Computing Environments for Implementing Certain Embodiments

Figure 8:
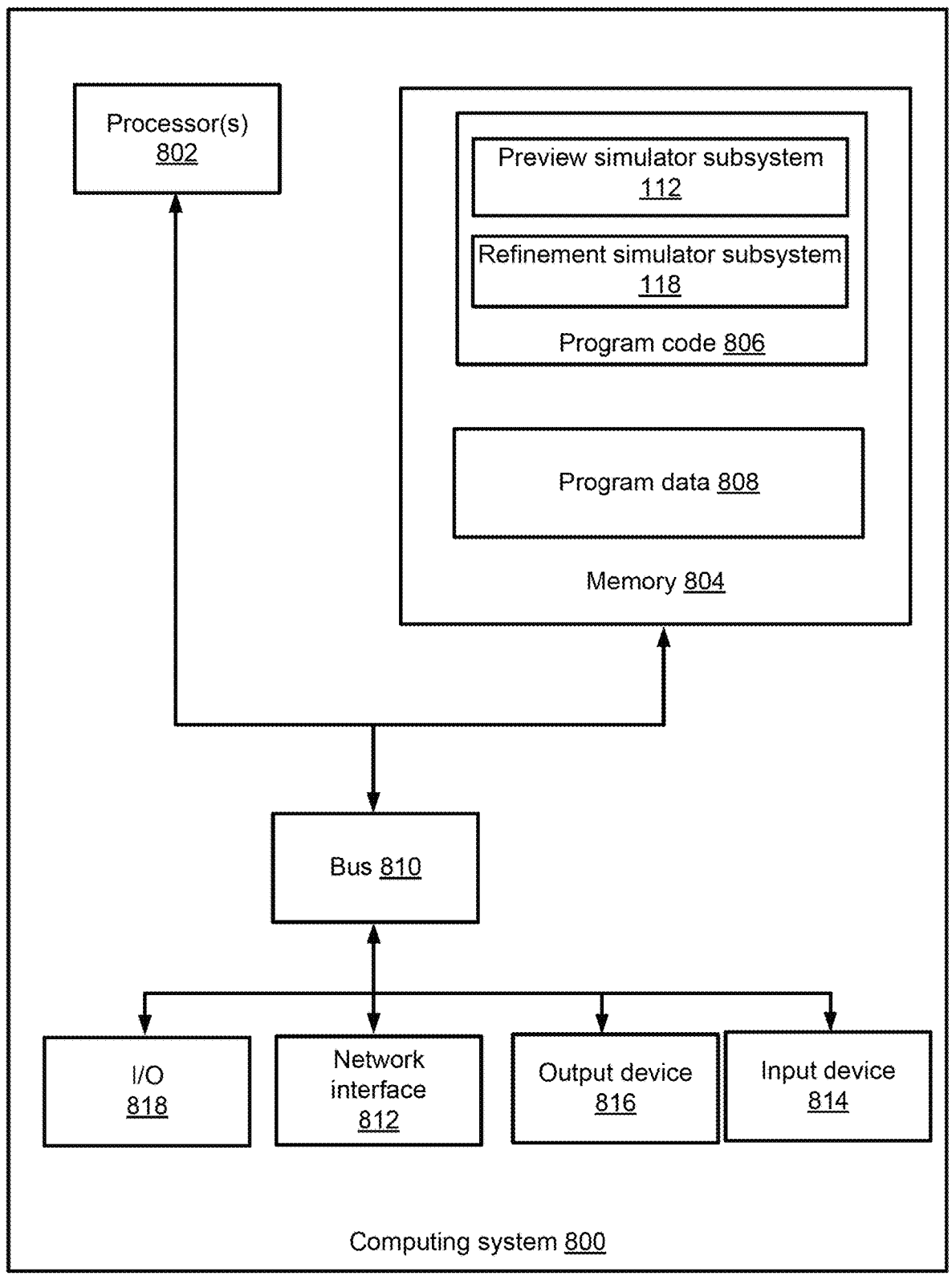
FIG. 8 depicts an example of a computing system that performs certain operations described herein, according to certain embodiments disclosed herein.

Any suitable computer system or group of computer systems can be used for performing the operations described herein. For example, FIG. 8 depicts an example of a computer system 800. The depicted example of the computer system 800 includes a processing device 802 communicatively coupled to one or more memory components 804. The processing device 802 executes computer-executable program code stored in a memory components 804, accesses information stored in the memory component 804, or both. Execution of the computer-executable program code causes the processing device to perform the operations described herein. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory components 804 includes any suitable non-transitory computer-readable medium for storing program code 806, program data 808, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 504 can be volatile memory, non-volatile memory, or a combination thereof.

The computer system 800 executes program code 806 that configures the processing device 802 to perform one or more of the operations described herein. Examples of the program code 806 include, in various embodiments, the scene modeling system 110 (including the preview simulator subsystem 112 and the refinement simulator subsystem 118) of FIG. 1, which may include any other suitable systems or subsystems that perform one or more operations described herein (e.g., one or more neural networks, encoders, attention propagation subsystem and segmentation subsystem). The program code 806 may be resident in the memory components 804 or any suitable computer-readable medium and may be executed by the processing device 802 or any other suitable processor.

The processing device 802 is an integrated circuit device that can execute the program code 806. The program code 806 can be for executing an operating system, an application system or subsystem, or both. When executed by the processing device 802, the instructions cause the processing device 802 to perform operations of the program code 806. When being executed by the processing device 802, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 804 store the program data 808 that includes one or more datasets described herein. In some embodiments, one or more of data sets are stored in the same memory component (e.g., one of the memory components 804). In additional or alternative embodiments, one or more of the programs, data sets, models, and functions described herein are stored in different memory components 804 accessible via a data network. One or more buses 810 are also included in the computer system 800. The buses 810 communicatively couple one or more components of a respective one of the computer system 800.

In some embodiments, the computer system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computer system 800 is able to communicate with one or more other computing devices via a data network using the network interface device 812.

The computer system 800 may also include a number of external or internal devices, an input device 814, a presentation device 816, or other input or output devices. For example, the computer system 800 is shown with one or more input/output ("I/O") interfaces 818. An I/O interface 818 can receive input from input devices or provide output to output devices. An input device 814 can include any device or group of devices suitable for receiving visual, auditory, or other suitable input that controls or affects the operations of the processing device 802. Non-limiting examples of the input device 814 include a touchscreen, a mouse, a keyboard, a microphone, a separate mobile computing device, etc. A presentation device 816 can include any device or group of devices suitable for providing visual, auditory, or other suitable sensory output. Non-limiting examples of the presentation device 816 include a touchscreen, a monitor, a speaker, a separate mobile computing device, etc.

Although FIG. 8 depicts the input device 814 and the presentation device 816 as being local to the computer system 800, other implementations are possible. For instance, in some embodiments, one or more of the input device 814 and the presentation device 816 can include a remote client-computing device that communicates with computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
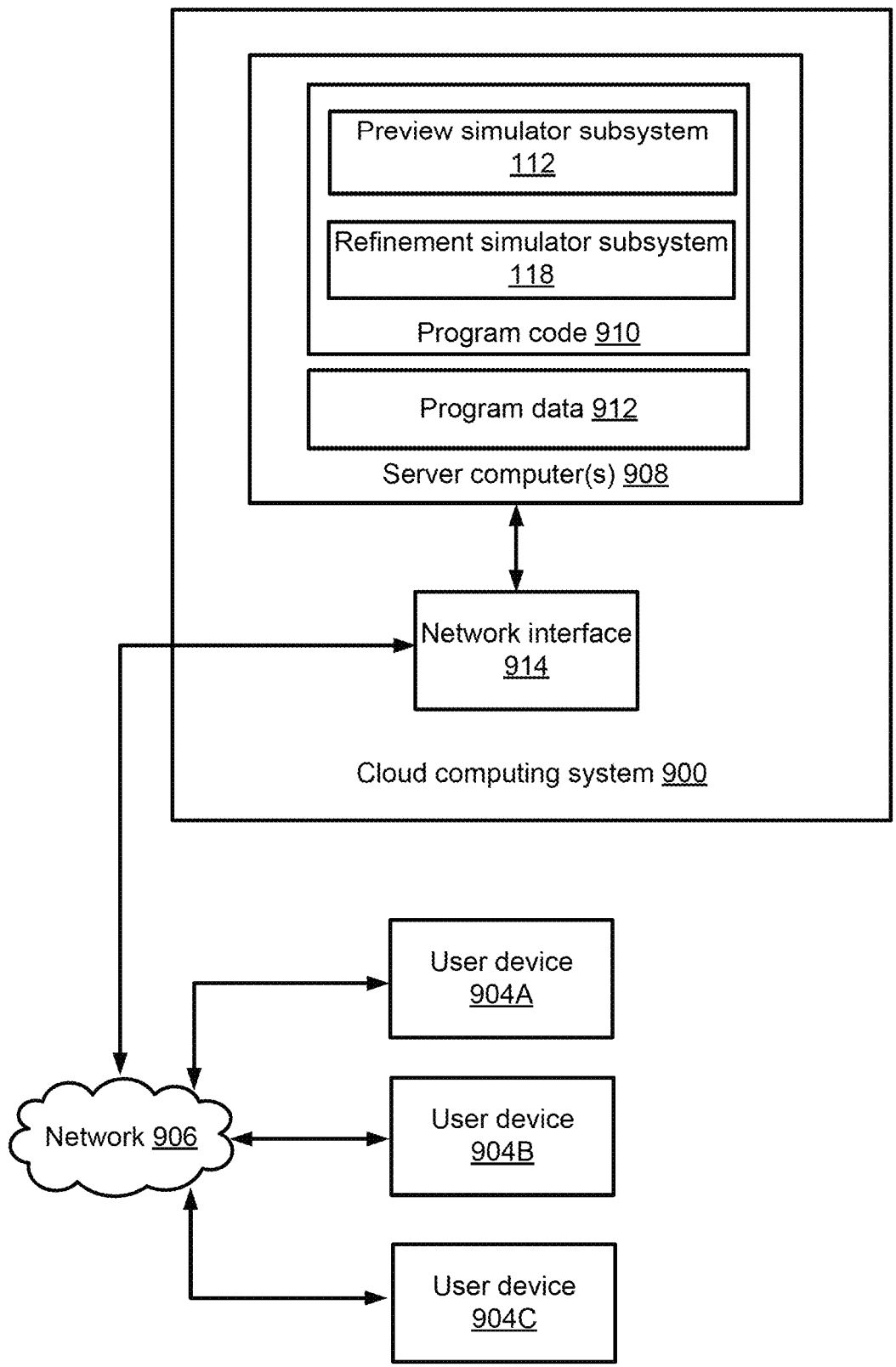
FIG. 9 depicts an example of a cloud computing system that performs certain operations described herein, according to certain embodiments disclosed herein.

In some embodiments, the functionality provided by computer system 800 may be offered as cloud services by a cloud service provider. For example, FIG. 9 depicts an example of a cloud computer system 900 offering a service for performing a progressive cloth simulation to generate an overlaid cloth object 103, that can be used by a number of user subscribers using user devices 904A, 904B, and 904C across a data network 906. The cloud computer system 900 performs the processing to provide the service of a progressive cloth simulation to generate an overlaid cloth object 103. The cloud computer system 900 may include one or more remote server computers 908.

The remote server computers 908 include any suitable non-transitory computer-readable medium for storing program code 910 (e.g., the preview simulator subsystem 112 and the refinement simulator subsystem 118 of FIG. 1) and program data 912, or both, which is used by the cloud computer system 900 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 908 can include volatile memory, non-volatile memory, or a combination thereof.

One or more of the server computers 908 execute the program code 910 that configures one or more processing devices of the server computers 908 to perform one or more of the operations that execute a progressive cloth simulation to generate an overlaid cloth object 103. As depicted in the embodiment in FIG. 9, the one or more servers providing the service for a progressive cloth simulation to generate an overlaid cloth object 103 may implement the preview simulator subsystem 112 and the refinement simulation subsystem 118. Any other suitable systems or subsystems that perform one or more operations described herein (e.g., one or more development systems for configuring an interactive user interface) can also be implemented by the cloud computer system 900.

In certain embodiments, the cloud computer system 900 may implement the services by executing program code and/or using program data 912, which may be resident in a memory component of the server computers 908 or any suitable computer-readable medium and may be executed by the processing devices of the server computers 908 or any other suitable processing device.

In some embodiments, the program data 912 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 906.

The cloud computer system 900 also includes a network interface device 614 that enable communications to and from cloud computer system 900. In certain embodiments, the network interface device 914 includes any device or group of devices suitable for establishing a wired or wireless data connection to the data networks 906. Non-limiting examples of the network interface device 914 include an Ethernet network adapter, a modem, and/or the like. The service for a progressive cloth simulation to generate an overlaid cloth object 103 is able to communicate with the user devices 904A, 904B, and 904C via the data network 906 using the network interface device 914.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with a scene modeling system, comprising:
   accessing a virtual scene including a three-dimensional (3D) virtual object and a mesh object that models a virtual cloth object;
   performing a refinement simulation on the mesh object to model a drape of the virtual cloth object over the 3D virtual object, wherein performing the refinement simulation comprises for each of a sequence of mesh resolutions of the mesh object less than a finest mesh level resolution:
      determining a proxy energy function, the proxy energy function comprising a mixed resolution objective function comparing the finest level mesh resolution of the sequence of mesh resolutions with a current mesh resolution within the sequence of mesh resolutions;

determining a configuration of the mesh object that minimizes the proxy energy function;

generating, for display via a user interface, an editable preview object comprising the mesh object at a coarsest level mesh resolution of the sequence of mesh resolutions; and displaying, via the user interface, the editable preview object during performance of the refinement simulation;

receiving, via the user interface, a modification to the editable preview object; and displaying, via the user interface, the modified editable preview object, wherein a configuration of the finest level mesh resolution of the mesh object in the refinement simulation is geometrically consistent with a configuration of the modified editable preview object.

2. The method of claim 1, wherein the modification to the editable preview object further comprises a modification to parameters associated with the virtual object, the method further comprising:

performing a preview simulation, based on the modified parameters, to generate the modified editable preview object.

3. The method of claim 2, wherein the parameters comprise a geometric configuration of nodes of the mesh object, wherein the modification to the parameters comprises a modification of at least a position of a node.

4. The method of claim 2, wherein the parameters comprise material parameters specifying material properties of the virtual cloth object, wherein the modification to the parameters comprises a modification of at least a material property of the material properties.

5. The method of claim 4, wherein the material properties comprise a material of the virtual cloth object and a thickness of the virtual cloth object.

6. The method of claim 1, further comprising displaying, via the user interface, the finest level mesh resolution of the mesh object determined in the refinement simulation.

7. The method of claim 1, wherein performing the refinement simulation further comprises:

generating a nested mesh hierarchy that includes prolongation functions which map, for the mesh object, from each mesh resolution of the sequence of mesh resolutions to a following mesh resolution in the sequence of mesh resolutions.

8. The method of claim 1, wherein the proxy energy function models one or more of a contact barrier potential, a friction potential, a strain-limiting potential, a membrane potential, and a bending potential.

9. The method of claim 1, wherein the refinement simulation is performed using the modified editable preview object as the coarsest level mesh resolution in the sequence of mesh resolutions.

10. A system comprising:
a memory component; and
a processing device coupled to the memory component, the processing device to perform operations comprising:

performing a refinement simulation on a mesh object to model a drape of a virtual cloth object over a 3D virtual object, wherein performing the refinement simulation comprises for each of a sequence of mesh resolutions of the mesh object less than a finest mesh level resolution:

determining a proxy energy function: the proxy energy function comprising a mixed resolution objective function comparing the finest level mesh resolution of the sequence of mesh resolutions with a current mesh resolution within the sequence of mesh resolution;

determining a configuration of the mesh object that minimizes the proxy energy function;

generating, for display via a user interface, an editable preview object comprising the mesh object at a coarsest level mesh resolution of the sequence of mesh resolutions; and displaying, via the user interface, the editable preview object during performance of the refinement simulation;

receiving, via the user interface, a modification to the editable preview object; and outputting, via the user interface, the finest level mesh resolution of the mesh object from the refinement simulation, wherein a configuration of the modified editable preview object is geometrically consistent with a configuration of the finest level mesh resolution of the mesh object.

11. The system of claim 10, wherein the modification to the editable preview object further comprises a modification to material properties associated with the virtual cloth object, the operations further comprising:

performing a preview simulation, based on the modified material properties, to generate the modified editable preview object.

12. The system of claim 11, wherein the material properties comprise a material of the virtual cloth object and a thickness of the virtual cloth object.

13. The system of claim 11, wherein the configuration of the editable preview object comprises a geometric configuration of nodes of the editable preview object, wherein the modification to the configuration of the editable preview object comprises a modification of at least a position of a node in the editable preview object.

14. The system of claim 11, wherein the modification to the editable preview object further comprises a modification to physical properties associated with the virtual cloth object comprising one or more of a contact barrier potential, a friction potential, a strain-limiting potential, a membrane potential, and a bending potential.

15. The system of claim 10, wherein performing the refinement simulation further comprises:

generating a nested mesh hierarchy that includes prolongation functions which map, for the mesh object, from each mesh resolution of the sequence of mesh resolutions to a following mesh resolution in the sequence of mesh resolutions.

16. A non-transitory computer-readable medium storing executable instructions, which when executed by a processing device, cause the processing device to perform operations comprising:

performing a refinement simulation on a mesh object to model a drape of a virtual cloth object over a 3D virtual object, wherein the mesh object models one or more material properties of the virtual cloth object, wherein performing the refinement simulation comprises for each of a sequence of mesh resolutions of the mesh object less than a finest mesh level resolution:

determining a proxy energy function, the proxy energy function comprising a mixed resolution objective function comparing the finest level mesh resolution of the sequence of mesh resolutions with a current mesh resolution within the sequence of mesh resolutions;

determining a configuration of the mesh object that minimizes the proxy energy function;

during performance of the refinement simulation, generating, for display via a user interface, an editable preview object comprising the mesh object at a coarsest level mesh resolution of the sequence of mesh resolutions;

receiving, via the user interface, a modification to the editable preview object, wherein the modification comprises changing the material properties;

performing a preview simulation, based on the modified material properties, to generate the modified editable preview object, wherein a configuration of the modified editable preview object is different from a configuration of the editable preview object; and displaying, via the user interface, the modified editable preview object, wherein a configuration of a finest level mesh resolution of the mesh object in the refinement simulation is geometrically consistent with a configuration of the modified editable preview object.

17. The non-transitory computer-readable medium of claim 16, wherein the modification to the editable preview object further comprises a modification to a configuration of the editable preview object, wherein the modification to the configuration of the editable preview object comprises a change in position of at least one node in the editable preview object, wherein the preview simulation is performed further based on the modified configuration of the editable preview object.

18. The non-transitory computer-readable medium of claim 16, wherein the modification to the editable preview object further comprises a modification to physical properties associated with the virtual cloth object comprising one or more of a contact barrier potential, a friction potential, a strain-limiting potential, a membrane potential, and a bending potential, wherein the preview simulation is performed further based on the modified material properties.

19. The non-transitory computer-readable medium of claim 16, wherein performing the refinement simulation further comprises:

generating a nested mesh hierarchy that includes prolongation functions which map, for the mesh object, from each mesh resolution of the sequence of mesh resolutions to a following mesh resolution in the sequence of mesh resolutions.

* * * * *